(12) United States Patent
Chun et al.

(10) Patent No.: US 8,578,222 B2
(45) Date of Patent: Nov. 5, 2013

(54) SERDES POWER THROTTLING AS A FUNCTION OF DETECTED ERROR RATE

(75) Inventors: Dexter T Chun, San Diego, CA (US); Jack K Wolf, San Diego, CA (US); Jungwon Suh, San Diego, CA (US); Tirdad Sowlati, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 318 days.

(21) Appl. No.: 13/029,934

(22) Filed: Feb. 17, 2011

(65) Prior Publication Data

US 2012/0216084 A1 Aug. 23, 2012

(51) Int. Cl.
*G06F 11/00* (2006.01)

(52) U.S. Cl.
USPC .......................................... 714/708; 714/704

(58) Field of Classification Search
USPC ................................................. 714/708, 704
See application file for complete search history.

(56) References Cited

U.S. PATENT DOCUMENTS

| | | | |
|---|---|---|---|
| 5,128,965 A | | 7/1992 | Henriksson |
| 5,768,684 A | | 6/1998 | Grubb et al. |
| 6,650,141 B2* | | 11/2003 | Agrawal et al. ................ 326/41 |
| 6,771,929 B1 | | 8/2004 | Nivens et al. |
| 6,895,520 B1* | | 5/2005 | Altmejd et al. .............. 713/324 |
| 7,208,975 B1* | | 4/2007 | Agrawal et al. ................ 326/38 |
| 7,251,256 B1* | | 7/2007 | Barry et al. ................... 370/503 |
| 7,613,958 B2* | | 11/2009 | Lesartre et al. .............. 714/701 |
| 7,656,323 B2* | | 2/2010 | Bereza et al. ................ 341/100 |
| 7,721,159 B2* | | 5/2010 | Lesartre et al. ................ 714/51 |
| 7,760,115 B2* | | 7/2010 | Boomer et al. .............. 341/100 |
| 8,325,793 B2* | | 12/2012 | Zhong .......................... 375/233 |
| 2005/0158056 A1* | | 7/2005 | Kim ............................ 398/155 |
| 2006/0071691 A1* | | 4/2006 | Garlepp ......................... 326/93 |
| 2007/0016835 A1* | | 1/2007 | Hronik et al. ................ 714/727 |
| 2008/0304559 A1* | | 12/2008 | Wu et al. ...................... 375/233 |
| 2009/0024883 A1* | | 1/2009 | Bethard ....................... 714/708 |

(Continued)

FOREIGN PATENT DOCUMENTS

| | | |
|---|---|---|
| EP | 2317655 A1 | 5/2011 |
| JP | 2010258747 A | 11/2010 |
| WO | WO2010021164 A1 | 2/2010 |

OTHER PUBLICATIONS

Partial International Search Report—PCT/US2012/025526—ISA/EPO—Jun. 4, 2012.

(Continued)

*Primary Examiner* — Cynthia Britt
(74) *Attorney, Agent, or Firm* — S. Hossain Beladi

(57) ABSTRACT

A system involves a first SerDes link from a first integrated circuit (IC) to a second IC and a second link from the second IC to the first IC. Power consumption settings in circuitry of the first link are adjusted to control power consumption such that the bit error rate of the first link is maintained in a range, where the lower bound of the range is substantially greater than zero. Power consumption settings in circuitry for the second link are adjusted to control power consumption such that the bit error rate of the second link is maintained in range, where the lower bound of the range is substantially greater than zero. In one example, circuitry in the second IC detects errors in the first link and reports back via the second link. The first IC uses the reported information to determine a bit error rate for the first link.

49 Claims, 19 Drawing Sheets

(56) References Cited

U.S. PATENT DOCUMENTS

| | | |
|---|---|---|
| 2009/0080584 A1* | 3/2009 | Hamano et al. ............... 375/371 |
| 2009/0224809 A1* | 9/2009 | Matsumoto et al. .......... 327/141 |
| 2009/0252054 A1 | 10/2009 | Barkan et al. |
| 2009/0257514 A1 | 10/2009 | Connolly et al. |
| 2009/0304054 A1* | 12/2009 | Tonietto et al. ............... 375/221 |
| 2010/0115316 A1 | 5/2010 | Diab |
| 2010/0177841 A1* | 7/2010 | Yoon et al. .................... 375/295 |
| 2011/0123201 A1* | 5/2011 | Nosaka et al. ................ 398/182 |
| 2012/0146665 A1* | 6/2012 | Misek et al. .................. 324/613 |

OTHER PUBLICATIONS

International Search Report and Written Opinion—PCT/US2012/025526—ISA/EPO—Sep. 17, 2012.

* cited by examiner

SERDES SYSTEM

SERDES RECEIVER SIGNALS

PROCESSOR IN MORE DETAIL

BIT ERROR RATE RANGE

OPERATION OF THE SERDES DEVICE IN THE PROCESSOR

OPERATION OF THE SERDES DEVICE IN
THE PROCESSOR

RECEIVER (RX)

EQUALIZER

DESERIALIZER AND FIFO
BUFFER

LOOP FILTER
(DIGITAL LOW PASS FILTER OF THE CLOCK AND DATA RECOVERY CIRCUIT)

PHASE-LOCKED LOOP

| SIGNAL | (FINE)<br>FINE_SELECT = 1 | (COARSE)<br>FINE_SELECT = 0 |
|---|---|---|
| $\Phi_0$ | ⌐ | ⌐ |
| $\Phi_1$ | ⌐ | NOT DRIVEN - NOT TOGGLING |
| $\Phi_2$ | ⌐ | ⌐ |
| ⋮ | ⋮ | ⋮ |
| $\Phi_7$ | ⌐ | NOT DRIVEN - NOT TOGGLING |

PLL OUTPUT

PROCESSOR SERDES POWER CONSUMPTION
(DIAGRAM NOT TO SCALE)

| HIGHER POWER MODE | 100% |
| --- | --- |
| LOWER POWER MODE (EQUALIZER ON) | -20.5% |
| LOWER POWER MODE (EQUALIZER OFF) | -22.5% |

PROCESSOR SERDES POWER CONSUMPTION

WIDEBAND CHANNEL

SLIGHTLY BAND LIMITED CHANNEL

MODERATELY BAND LIMITED CHANNEL

SERDES POWER THROTTLING AS A FUNCTION OF DETECTED ERROR RATE

BACKGROUND INFORMATION

1. Technical Field

The present disclosure relates to Serial/Deserializer (SerDes) devices.

2. Background Information

Traditionally, the bus in a computer between the computer's Central Processing Unit (CPU) and the computer's main memory was a parallel bus. As the processing throughput of computers increased, and as demands on memory bandwidth increased, it became increasingly common for the bus between the CPU and memory to be implemented as one or more Serializer/Deserializer (SerDes) links. These SerDes links have tended to be relatively expensive and generally have consumed large amounts of power. SerDes links have therefore generally not been considered suitable for use in mobile devices (such as cellular telephones) where keeping power consumption low is very important. Recently, however, there has been a movement to use SerDes or SerDes-like technologies in low power mobile devices such as cellular telephones. For example, there is a JEDEC (Joint Electron Device Engineering Council) proposed standard under discussion for a SerDes interface. This proposed standard includes power saving features to make the proposed SerDes interface more suitable for low power mobile devices. In addition to the SerDes interface in the proposed JEDEC standard, there are numerous other known SerDes designs. These standards and known designs have included numerous features and methods for reducing power consumption.

A first example of such a power saving feature involves placing the SerDes interface in a low-power mode when the interface is not being actively accessed by the processor. Because of the inherent random-access use of memory by a typical CPU, however, the memory must essentially be available to the processor most of the time (with the exception of sleep mode operation). As a result, this first example of power saving is only minimally effective in reducing power consumption. A second example of a power saving feature involves cutting power to and disabling the PLL (Phase-Locked Loop) and (CDR) Clock and Data Recovery circuitry of the SerDes. Each side of a SerDes link includes a PLL and CDR. This circuitry may consume a lot of power. It is possible to turn these circuits off to reduce power consumption when the interface is not active. Unfortunately, there is an amount of time required to turn these circuits back on (settling and lock time of the PLL) and have them functional again. If these circuits are in their off states when the processor needs access to the memory, there will be a delay until the memory can be accessed via the SerDes links and that delay effectively stalls the processor. This is undesirable. A third example of a power saving feature is set forth in Published U.S. patent application US2006/0115316. In this example the signal swing of the SerDes transmitter is made only as large as it has to be to prevent transmission errors. However, for mobile applications there remains a need for more power savings, and in both the first and second examples principal power savings is achieved by making the SerDes interface unusable and inactive for part of the time such that processor use of the interface is complicated and partially compromised.

SUMMARY

A computer system involves a SerDes device in a processor integrated circuit and a SerDes device in a memory integrated circuit. Both SerDes devices include a SerDes transmitter portion and a SerDes receiver portion. The SerDes receiver portion in the memory integrated circuit has an error detection mechanism for detecting whether a packet sent from the SerDes device in the processor integrated circuit to the SerDes device in the memory integrated circuit via a first SerDes link contains an error. In one example, each packet sent across this first SerDes link includes a data payload portion and a CRC check portion. The SerDes device in the memory integrated circuit receives the packet, and uses CRC error detection circuitry to determine whether the CRC portion is proper for the data payload portion. If an error is detected, then the SerDes device in the memory integrated circuit reports an indication of the error (or errors) to the SerDes device in the processor integrated circuit via a second SerDes link. In one example, SerDes device in the memory integrated circuit does this reporting by sending a SerDes "keep alive" sync packet that includes error information in the form of a health status flag. The keep alive sync packet is sent from the memory integrated circuit across the second SerDes link to the processor integrated circuit. The error information can be an error rate as maintained by the SerDes device in the memory integrated circuit for this processor-to-memory link, or the error information can be an indication of an occurrence of an individual error or errors in the prior processor-to-memory communication across the first SerDes link. The SerDes device in the processor integrated circuit also has error detection and correction circuitry that detects errors in packets sent via the second link from the SerDes device of the memory integrated circuit to the SerDes device of the processor integrated circuit.

The SerDes device in the processor integrated circuit receives the "keep alive" sync packet and uses the error information carried by the packet to determine an error rate for the first SerDes link from the processor to the memory. In addition, the SerDes device uses its error detection CRC check portion to detect errors in the incoming packet received from the memory integrated circuit via the second SerDes link. The SerDes device in the processor integrated circuit uses this error information from its CRC check portion to determine an error rate for the second SerDes link from memory to processor.

If the determined error rate for the first SerDes link is below a lower error rate bound for the first SerDes link, then power consumption in the circuitry of the first SerDes link is decreased. In one example, the input impedance setting of the SerDes receiver in the memory integrated circuit is adjusted so the input impedance is higher. This causes the bit error rate of the first SerDes link to degrade. If the determined error rate for the first SerDes link is above an upper error rate bound for the first SerDes link, then power consumption in the circuitry of the first SerDes link is increased by decreasing the input impedance setting of the SerDes receiver in the memory. This causes the bit error rate of the first SerDes link to improve. If the determined error rate for the first SerDes link is between the upper and lower bounds, then it is determined to be within its acceptable bit error rate range and the power consumption settings for the circuitry of the first SerDes link are not changed.

Similarly, if the determined error rate for the second SerDes link from the memory integrated circuit to the processor integrated circuit is below a lower error rate bound for the second SerDes link, then the power consumption setting of the SerDes receiver in the processor integrated circuit is adjusted to reduce power consumption in the circuitry of the second SerDes link so that the bit error rate of the second SerDes link will degrade. If the determined error rate for the second SerDes link is above an upper error rate bound for the second SerDes link, then the power consumption setting of the SerDes receiver in the processor integrated circuit is adjusted to increase power consumption in the circuitry of the second SerDes link so that the bit error rate of the second SerDes link will improve. If the determined error rate for the second SerDes link is between the upper and lower bounds, then it is determined to be within its acceptable range and the power consumption setting of circuitry of the second SerDes link is not changed. A SerDes link may involve one or more pairs of signals.

As packets are communicated across the first SerDes link, the determined bit error rate for the first SerDes link is updated and the input impedance setting of the SerDes receiver of the memory integrated circuit is adjusted such that the error rate of the first link is substantially maintained within its acceptable range. The lower error rate bound is substantially greater than zero, so the power consumption of the circuitry of the first SerDes link is made smaller than it would otherwise be were the link operated to minimize bit errors. The upper and lower error rate bounds for the first SerDes link can be adjusted to change the tradeoff between power consumption and bit error rate. The tradeoff between power consumption and bit error rate for the first SerDes link can be dynamically controlled and optimized for the particular operating condition of the processor and computer system and environmental conditions.

Similarly, as packets are communicated across the second SerDes link, the determined bit error rate for the second SerDes link is updated and the power consumption setting of the SerDes receiver of the processor is adjusted such that the error rate of the second link is substantially maintained within its acceptable range. The lower error rate bound is substantially greater than zero, so power consumption of the circuitry of the second SerDes link is made smaller than it would otherwise be were the link operated to minimize bit errors. The upper and lower error rate bounds for the first SerDes link can be adjusted to change the tradeoff between power consumption and bit error rate. The tradeoff between power consumption and bit error rate for the second SerDes link can be dynamically controlled and optimized for the particular operating condition of the processor and computer system and environmental conditions.

Error detection and correction circuitry is provided in the SerDes receivers of both the first and second SerDes links. This error detection and correction circuitry can detect one or more bit errors in a SerDes communication and correct a single bit error. By providing this error detection and correction circuitry, the need to retransmit to successfully communicate data across a SerDes link is reduced despite the fact that the lower bounds of the acceptable bit error rate ranges are set to be substantially greater than zero. If more powerful error correction circuitry is provided, then the lower bounds of the acceptable bit error rate ranges of the two links can be increased without substantially impacting the retransmission rates across the links. Power consumption of the SerDes receiver of a link is reduced in situations in which the SerDes link is active and usable in contrast to prior art examples where power consumption is reduced by disabling the SerDes receiver and compromising use of the link.

The foregoing is a summary and thus contains, by necessity, simplifications, generalizations and omissions of detail; consequently, those skilled in the art will appreciate that the summary is illustrative only and does not purport to be limiting in any way. Other aspects, inventive features, and advantages of the devices and/or processes described herein, as defined solely by the claims, will become apparent in the non-limiting detailed description set forth herein.

DETAILED DESCRIPTION

Figure 1:
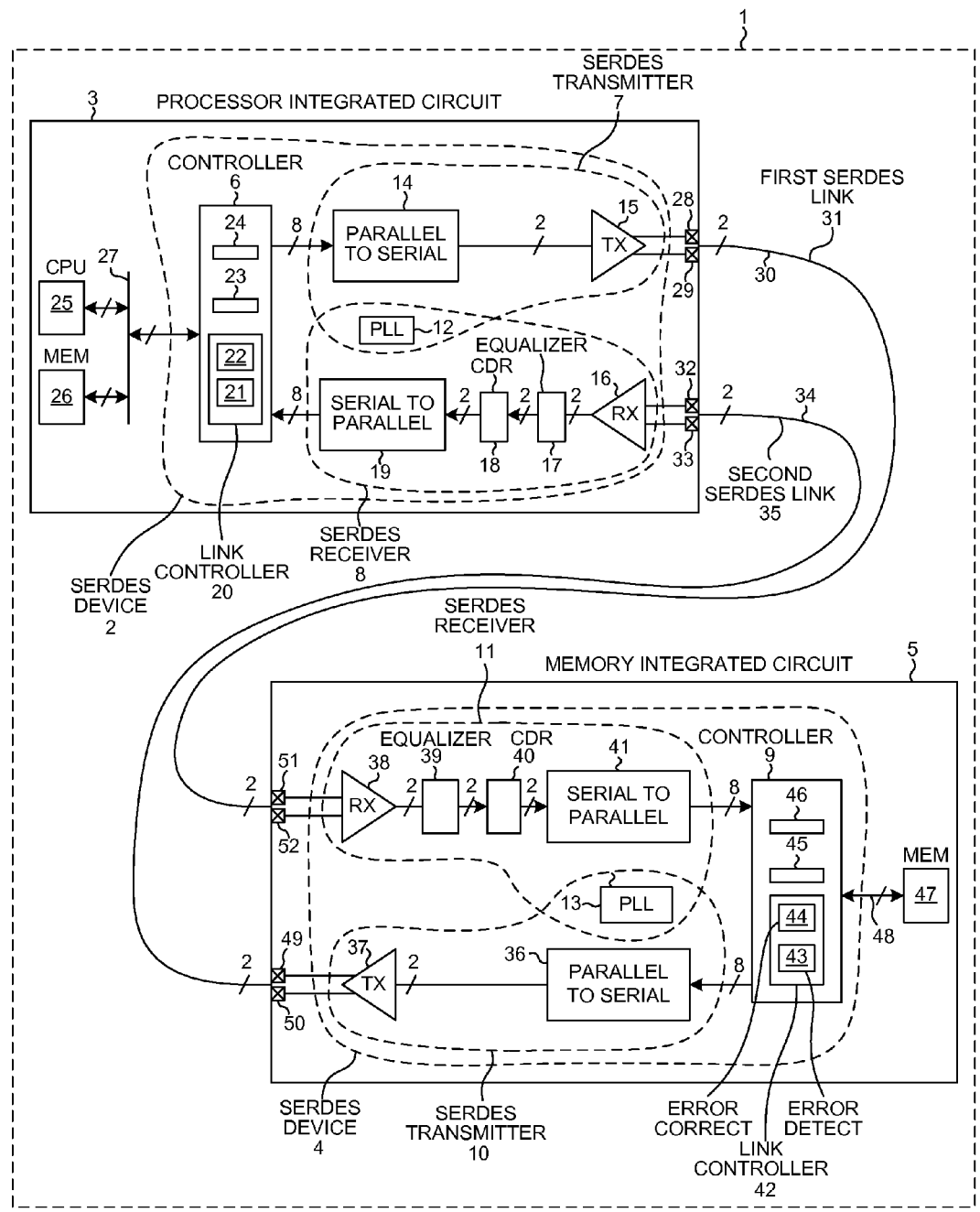
FIG. 1 is a simplified diagram of a SerDes system within a battery-powered mobile communication device in accordance with one novel aspect.

FIG. 1 is a diagram of a system 1 involving involves a SerDes device 2 in a processor integrated circuit 3 and a SerDes device 4 in a memory integrated circuit 5. In one example, system 1 is a battery-powered wireless mobile communication device such as a cellular telephone handset. SerDes device 2 includes a controller portion 6, a SerDes transmitter portion 7 and a SerDes receiver portion 8. SerDes device 4 includes a controller portion 9, a SerDes transmitter portion 10 and a SerDes receiver portion 11. A Phase-Locked Loop (PLL) 12 in the SerDes device 2 of the processor integrated circuit 3 is considered to be both part of the SerDes transmitter portion 7 and part of the SerDes receiver portion 8. Likewise, a PLL 13 in the SerDes device 4 of the memory integrated circuit 5 is considered to be both part of the SerDes transmitter portion 10 and part of the SerDes receiver portion 11.

The SerDes transmitter portion 7 of the processor integrated circuit 3 includes a parallel-to-serial circuit 14 referred to as a serializer and a transmitter driver TX 15. The SerDes receiver portion 8 of the processor integrated circuit 3 includes a receiver amplifier RX 16, equalizer 17, Clock and Data Recovery (CDR) circuitry 18, and a serial-to-parallel circuit 19 referred to as a deserializer. Controller portion 6 includes a link controller 20 that in turn includes error detection circuitry 21, error correction circuitry 22, and a pair of registers 23 and 24. A Central Processing Unit (CPU) 25 communicates with a local cache memory 26 and with controller 6 via a parallel local bus functionality 27. Symbols 28 and 29 represent two integrated circuit terminals through which transmitter TX 15 transmits differential SerDes signals onto two corresponding conductors 30 of a first SerDes link 31. Symbols 32 and 33 represent two integrated circuit terminals through which receiver RX 16 receives differential SerDes signals from two corresponding conductors 34 of a second SerDes link 35.

The SerDes transmitter portion 10 of the memory integrated circuit 5 includes a parallel-to-serial circuit 36 and a transmitter TX 37. The SerDes receiver portion 11 of the memory integrated circuit 5 includes a receiver amplifier RX 38, equalizer 39, Clock and Data Recovery (CDR) circuitry 40, and a serial-to-parallel circuit 41. Controller portion 9 includes a link controller 42 that in turn includes error detection circuitry 43, error correction circuitry 44, and a pair of registers 45 and 46. An amount of memory 47 is coupled to controller 9 via a bus interface 48. Symbols 49 and 50 represent two integrated circuit terminals through which transmitter TX 37 transmits differential SerDes signals onto the two conductors 34 of the second SerDes link 35. Symbols 51 and 52 represent two integrated circuit terminals through which receiver RX 38 receives differential SerDes signals from the two conductors 30 of the first SerDes link 31.

Figure 2:
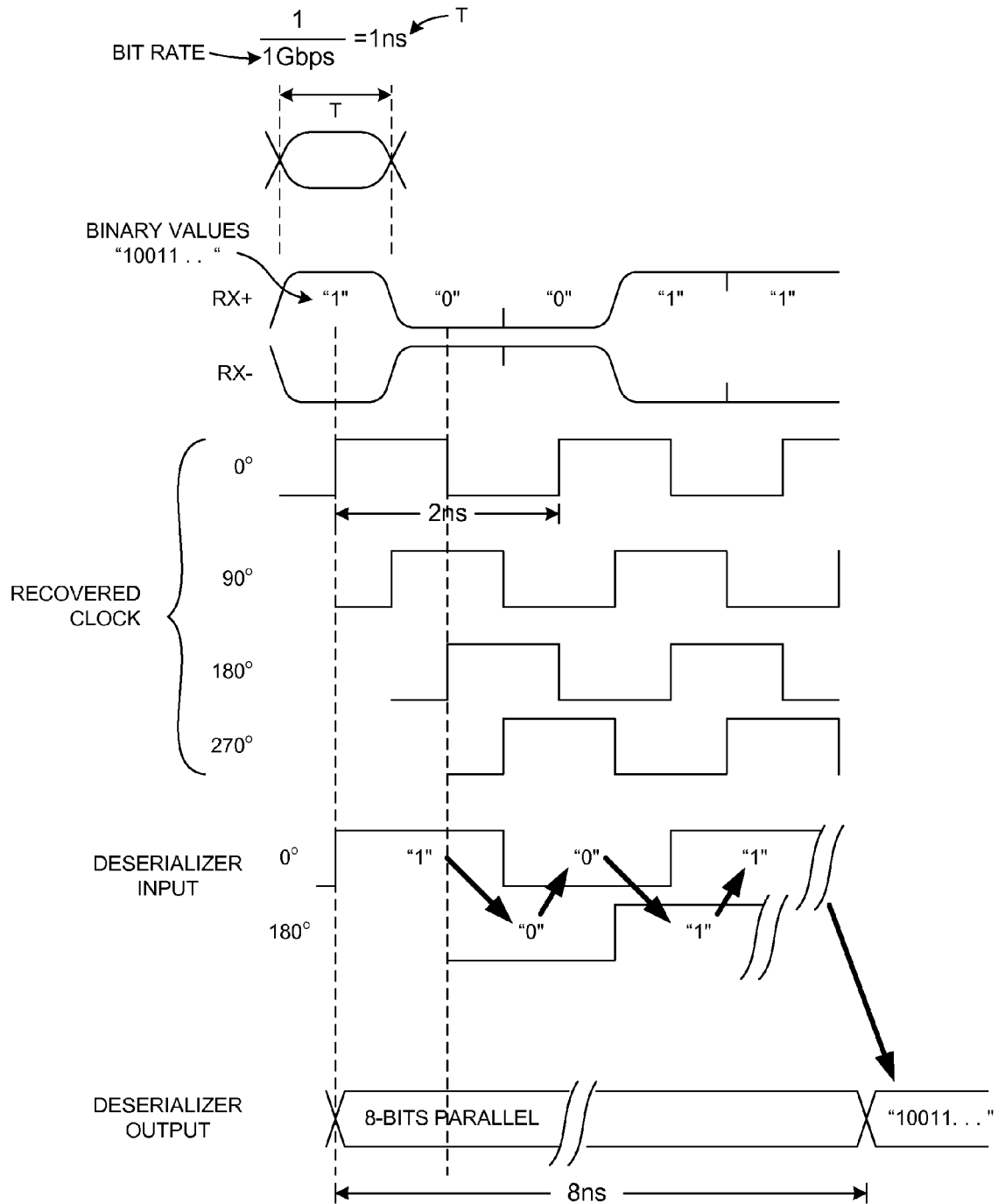
FIG. 2 is a waveform diagram that illustrates how a SerDes signal is received in the system of FIG. 1.

FIG. 2 is a waveform diagram of SerDes signals communicated across the SerDes links of FIG. 1. Take, for example, SerDes signals communicated across the first SerDes link 31. The signals RX+ and RX− are the SerDes signals on the conductors 30 as received onto input terminals 51 and 52 of memory integrated circuit 5. The waveforms labeled 0°, 90°, 180° and 270° in FIG. 2 represent multi-phase clock signals that are generated by the Clock and Data Recovery (CDR) 40. These recovered clock signals are used to sample the differential output of receiver RX 38. One of the recovered clock signals transitions high in the middle of each of the bit times of the incoming serial data stream as indicated so that the value of the serial data stream can be sampled. The waveforms labeled "DESERIALIZER INPUT" in FIG. 2 represent the signals output by the equalizer and CDR block 39,40 of FIG. 1. The waveform labeled "DESERIALIZER OUTPUT" in FIG. 2 represents the eight-bit parallel output of the serial-to-parallel circuit 41 of FIG. 1. Note that the serial stream of bit values 1, 0, 0, 1 and 1 that is received serially as differential signal RX+ and RX− at terminals 51 and 52 is output in digital form at the eight-bit output of deserializer circuit 41 as indicated by the waveform "DESERIALIZER OUTPUT". In the present example, one bit is communicated every one nanosecond. This corresponds to a bit rate of one gigabit per second.

Figure 3:
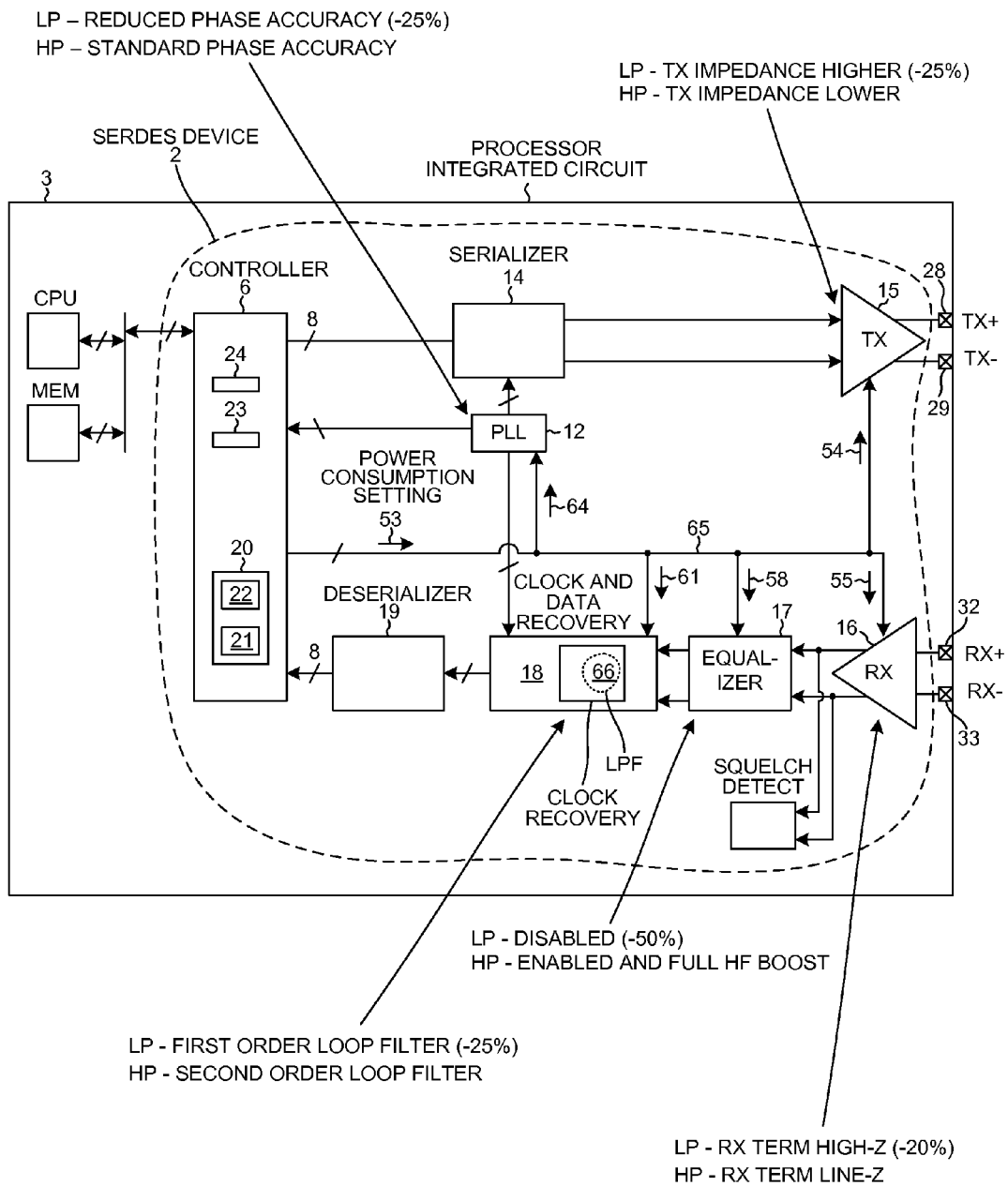
FIG. 3 is a more detailed diagram of the SerDes device 2 in the processor integrated circuit 3 of the SerDes system of FIG. 1.

FIG. 3 is a more detailed diagram of the SerDes device 2 in the processor integrated circuit 3. The controller 6 outputs a multi-bit digital power consumption setting 53. Power consumption setting 53 is a composite of multiple digital settings 54, 55, 58, 61 and 64 that are supplied to the various sub-blocks of the SerDes device. For example, a first of the settings 54 is a multi-bit digital value that is supplied to transmitter TX 15. Setting 54 sets the output impedance of transmitter TX 15. The output impedance of the transmitter determines the edge rate and signal reflection at the transmitter with which the SerDes transmitter 15 will drive the output signal. In a lower power mode the output impedance of transmitter TX 15 is higher (slower edge rate), whereas in a higher power mode the output impedance of transmitter TX 15 is lower (faster edge rate). Whether the output impedance is higher or lower is determined by the value of setting 54. In addition, there is a VDIFF setting that sets the levels (current levels) of the high and low signal levels to which the transmitter TX of the SerDes device in the processor drives its output. In the lower power setting there is a smaller difference (current difference) between the high signal level and the low signal level, whereas in the higher power setting there is a larger difference (current difference) between the high signal level and the low power level. In the notion of FIG. 3, "LP" indicates the lower power mode or setting, whereas "HP" indicates the higher power mode or setting. The "−25%" notation indicates that the transmitter TX consumes approximately twenty-five percent less power in lower power mode as compared to its power consumption in the higher power mode.

A second of the settings is a setting 55 that is supplied to receiver RX 16. Setting 55 includes a one-bit termination select value portion (TERM_SELECT) 56 and a multi-bit termination value portion (TERM_VALUE) 57. In a lower power mode, low impedance termination is disabled such that the input impedance looking into receiver RX 16 from terminals 32 and 33 is relatively high. This impedance may be greater than the line impedance of the conductors 34 and other parts of the second SerDes link 35. Using this higher input impedance generally results in undesirable signal reflection causing poor receiver signal quality. In a higher power mode, termination is enabled and the input impedance of receiver RX 16 is lower. In one example, the lower input impedance looking into receiver RX 16 is made to match the line impedance of the conductors 34 and the second SerDes link 35, and results in higher receiver signal quality. The actual value of the input impedance is determined by the multi-bit termination value portion (TERM_VALUE) 57. As indicated by the "−20%" notation, the receiver RX 16 consumes approximately twenty percent less power in the lower power mode as compared to its power consumption in the higher power mode.

A third setting is setting 58 that is supplied to equalizer 17. Setting 58 includes an equalizer power on portion (EQ_POWER_ON) 59 and an equalizer select portion (EQ_SELECT) 60. In a lower power mode, the equalizer on portion has a value that causes the equalizer to be turned off so that it is not powered. In a higher power mode, the equalizer on portion has a value that causes the equalizer to be turned on and powered, and also causes a high frequency boost functionality to be fully enabled. High frequency boost is either enabled or disabled depending on the value of the equalizer select portion 60. As indicated by the "−50%" notation, the receiver equalizer 17 consumes approximately fifty percent less power in the lower power mode as compared to its power consumption in the higher power mode.

A fourth setting is setting 61. Setting 61 is supplied to the Clock and Data Recovery (CDR) circuit 18. Setting 61 includes a second order select portion (SECOND_ORDER_SELECT) 62 and a fine select portion (FINE_SELECT) 63. In a lower power mode, a loop filter 66 within CDR circuit 18 is configured as a first order low pass filter, whereas in a higher power mode the loop filter is configured as a second order low pass filter. Whether loop filter 66 is configured as a first order filter or as a second order filter is determined by the value of the second order select portion 62. In the lower power mode, clock and data recovery is done using fewer multi-phase clock signals (coarse). In the higher power mode, clock and data recovery is done using more multi-phase clock signals (fine). Whether fewer or more multi-phase clock signals are used is determined by the value of the fine select portion 63. As indicated by the "−25%" notation, the clock and data recovery circuit 18 consumes approximately twenty-five percent less power in the lower power mode as compared to its power consumption in the higher power mode.

A fifth setting is setting 64 supplied to PLL 12. Setting 64 allows the number of multi-phase clock signals the PLL drives to the CDR to be reduced under certain conditions to save power. Setting 64 supplied to PLL 12 in this particular example is the same as fine select portion (FINE_SELECT) 63 of setting 61 supplied to CDR circuit 18, but in other examples setting 64 can also include additional digital control bits for controlling other parts of the PLL. In a lower power mode the PLL drives fewer multi-phase clock signals to the CDR, whereas in a higher power mode the PLL drives more multi-phase clock signals to the CDR. Whether the PLL drives fewer or more multi-phase clock signals to the CDR is determined by the value of setting 64. As indicated by the "−25%" notation, the PLL 12 consumes approximately twenty-five percent less power in the lower power mode as compared to its power consumption in the higher power mode.

All these settings 54, 55, 58, 61 and 64 are supplied in the form of the composite power consumption setting 53 via conductors 65 from controller 6 to the various appropriate ones of the circuits 15-18 and 12 as illustrated in FIG. 3. Controller 6 can increase or decrease power consumption of the first SerDes link 31 by changing the value of setting 54 that is supplied to the SerDes transmitter portion 7. Controller 6 can increase or decrease power consumption of the second SerDes link 35 by changing the values of settings 55, 58, 61 and 64 that are supplied to SerDes receiver portion 8. There is a relationship between the amount of power consumed in these various parts of the SerDes circuitry and the bit error rate of the associated SerDes link. As power consumption to part of the circuitry is reduced more and more, at some point further reductions in power consumption of the circuitry starts to degrade performance and manifests itself as an increase in bit error rate. As explained further below, the power consumption setting of the SerDes circuitry is adjusted such that excessive power consumption in the SerDes circuitry does not occur. This is accomplished by controlling power consumption of the circuitry for a SerDes link such that the error rate of the link is maintained within an acceptable range, where the lower bound of the error rate range is substantially above zero. Power consumption in each of first and second SerDes links 31 and 35 is controlled in this way.

Figure 4:
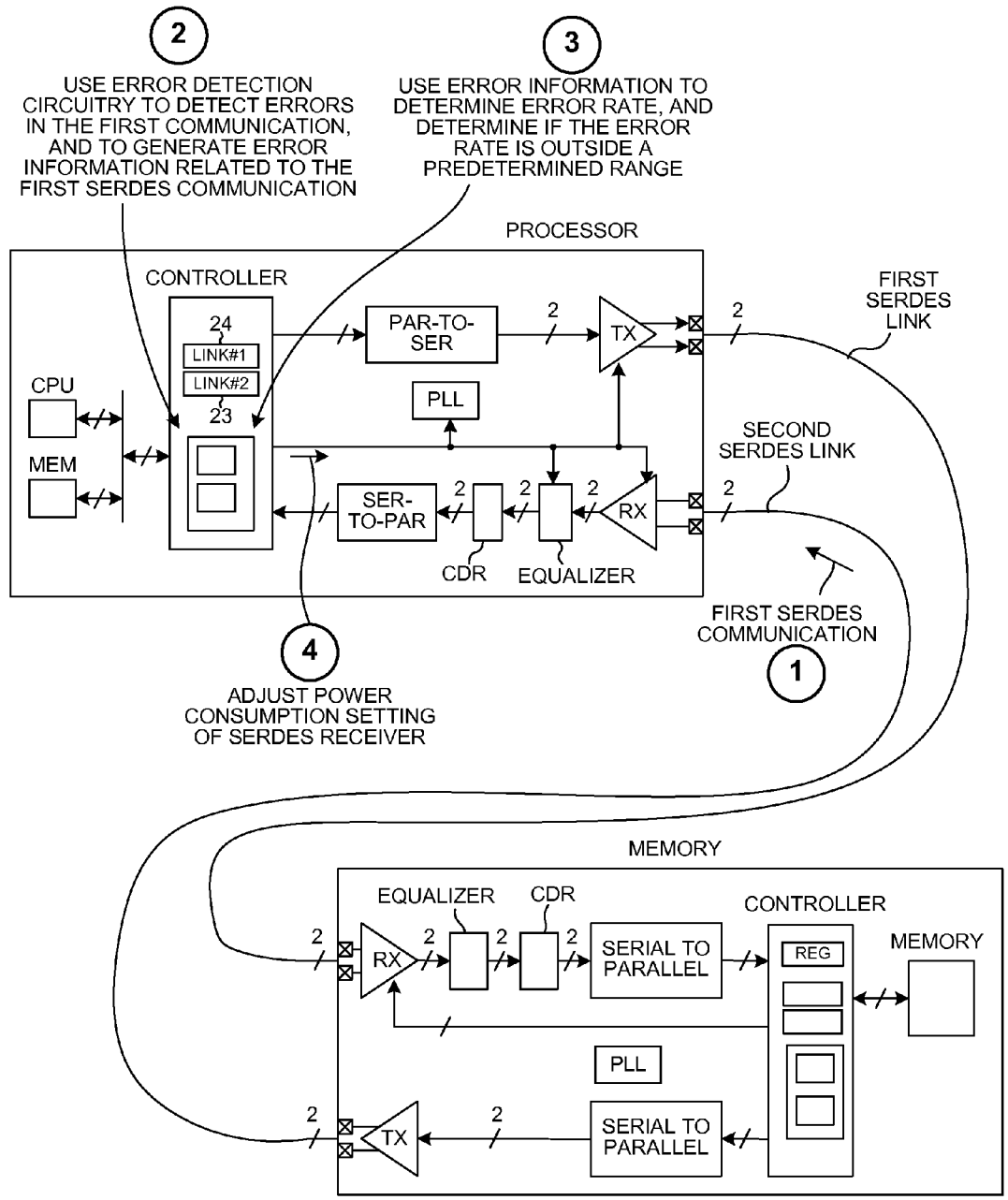
FIG. 4 is a diagram of a method of operation of the system 1 of FIG. 1 in accordance with a first novel aspect.

FIG. 4 is a diagram of a method of operation of the system 1 of FIG. 1 in accordance with a first novel aspect. The "1" in the circle in FIG. 4 indicates the first step. The SerDes device of the processor integrated circuit 3 receives a first SerDes communication across the second SerDes link from the SerDes device of the memory integrated circuit 5. The "2" in the circle in FIG. 4 indicates the second step. The error detection circuitry 21 in the controller 6 of the processor integrated circuit 3 checks the data payload of the SerDes communication with a CRC value of the SerDes communication and thereby determines whether one or more bit errors have occurred. The "3" in the circle in FIG. 4 indicates the third step. The determined information on whether a bit error occurred is used to determine and to update a bit error rate for the second SerDes link. This bit error rate is maintained in register 23. It is then determined whether the updated bit error rate for the second SerDes link is within an acceptable bit error rate range for the second SerDes link. If the updated bit error rate is in the acceptable range, then the power consumption setting 53 is not adjusted. If, however, the updated bit error rate is too low and is below the acceptable range, then the power consumption setting is adjusted (the fourth step as indicated by the "4" in the circle in FIG. 4) to decrease power consumption in the SerDes receiver portion 8 of the processor integrated circuit 3 such that the bit error rate is increased and returns to the acceptable range. If, on the other hand, the bit error rate is too large and is above the acceptable range, then the power consumption setting is adjusted (the fourth step) to increase power consumption in the SerDes receiver portion 8 of the processor integrated circuit 3 such that the bit error rate is decreased and returns to the acceptable range.

Figure 5:
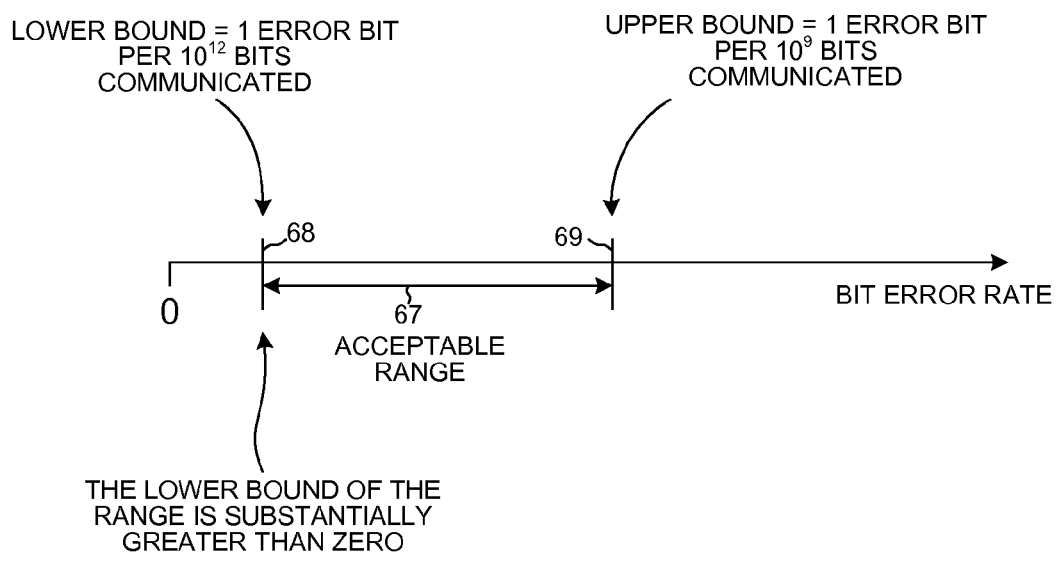
FIG. 5 is a diagram that illustrates the acceptable bit error rate range within which the bit error is maintained in the system of FIG. 1.

FIG. 5 is a diagram that illustrates the acceptable bit error rate range 67. The lower bound 68 of the range 67 in this case is one bit error per 10E12 bits communicated. The upper bound 69 of the range 67 in this case is one bit error per 10E9 bits communicated. Note that the lower bound 68 is substantially greater than zero. Power consumption is not increased to make the second SerDes link maximally reliable with the lowest possible bit error rate but rather power consumption is controlled to keep the bit error rate in the acceptable range.

It is to be understood that the upper and lower bounds of FIG. 5 are examples for the specific embodiment. In one example, the lower bound is substantially greater that zero in the sense that it is just low enough that the type of errors that cause retransmissions (for example, double errors in the specific embodiment) occur no more frequently than about ten times per second. The actual lower bound of the bit error rate in this case therefore depends on channel characteristics of the SerDes link of interest as well as on the error detection and correction capabilities of the SerDes receiving circuitry of the particular implementation.

Figure 6:
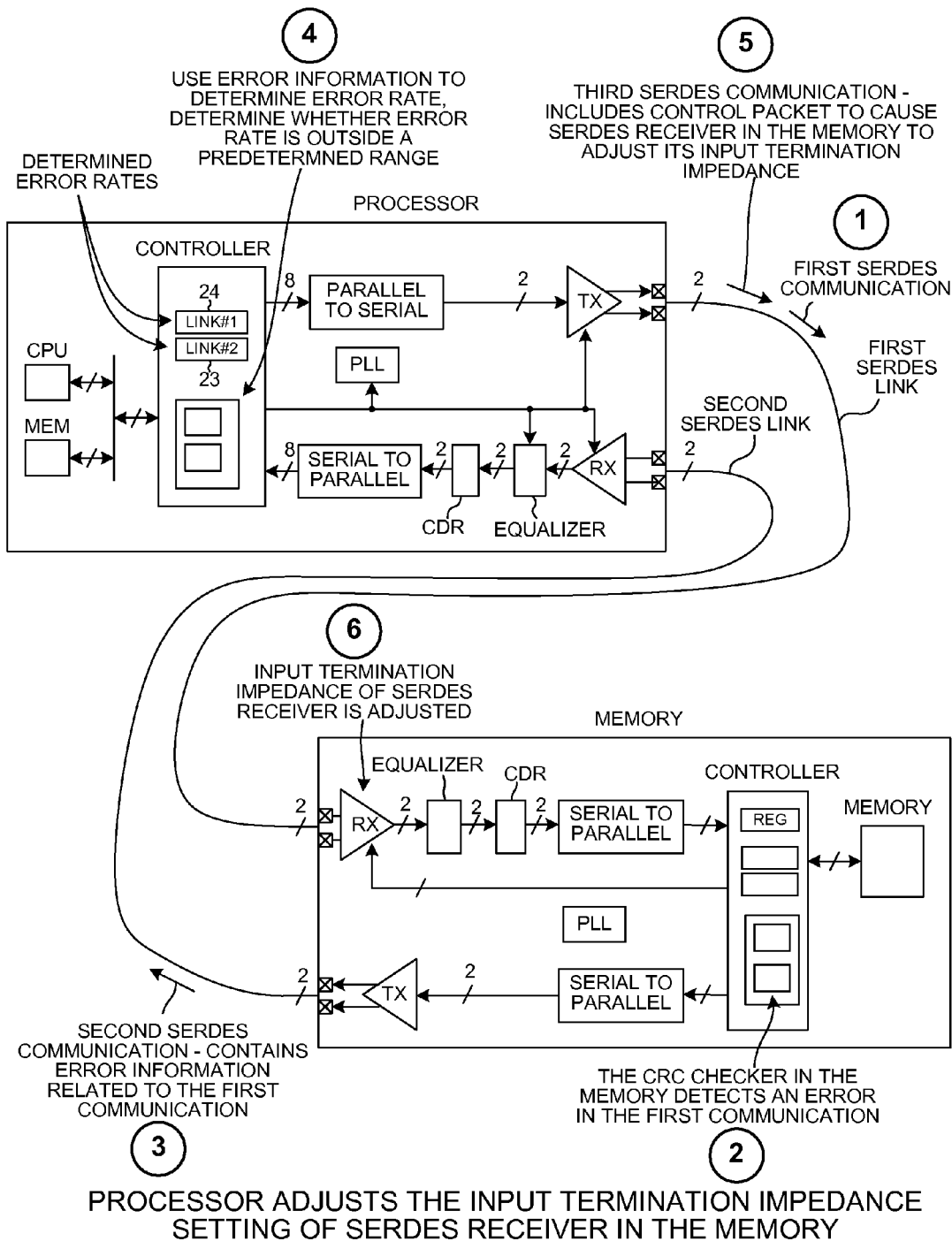
FIG. 6 is a diagram of a method of operation of the system 1 of FIG. 1 in accordance with a second novel aspect.

FIG. 6 is a diagram of a method of operation of the system 1 of FIG. 1 in accordance with a second novel aspect. The "1" in the circle in FIG. 6 indicates the first step. The SerDes device 2 of the processor integrated circuit 3 transmits a first SerDes communication across the first SerDes link to the SerDes device 4 of the memory integrated circuit 5. The "2" in the circle in FIG. 6 indicates the second step. The error detection circuitry 43 in the controller 9 of the memory integrated circuit 5 checks the data payload of the SerDes communication with a CRC value of the SerDes communication and thereby determines whether one or more bit errors have occurred. The "3" in the circle in FIG. 6 indicates the third step. The SerDes device in the memory integrated circuit 5 transmits a second SerDes communication back to the SerDes device of the processor integrated circuit 3, where this SerDes communication contains error information indicating how many bit errors were detected in the first SerDes communication. In one example this second SerDes communication is a keep alive sync packet that includes a health status flag indicating a number of bit errors detected. The "4" in the circle in FIG. 6 indicates the fourth step. The controller 6 in the SerDes device of the processor integrated circuit 3 receives the second SerDes communication and uses the error information contained in the second SerDes communication to determine and to update a bit error rate for the first SerDes link. In one example, the controller 6 maintains a running count of the number of bits it attempts to send to the SerDes device of the memory across the first SerDes link. In addition, it maintains a running count of the number of bit errors that occurred across the first SerDes link by summing the bit errors reported by the SerDes device in keep alive sync packets. The total number of bit errors divided by the total number of bits that were attempted to be sent is the bit error rate. The updated bit error rate for the first SerDes link is stored in register 24. It is then determined whether this updated bit error rate for the first SerDes link is within an acceptable bit error rate range for the first SerDes link. If the updated bit error rate is in the acceptable range, then the power consumption settings of the circuitry of the first SerDes are not adjusted. If, however, the bit error rate is too low and is below the acceptable range, then the SerDes device of the processor integrated circuit 3 transmits a third SerDes communication (the fifth step) via the first SerDes link to the SerDes device of the memory integrated circuit 5. This third SerDes communication includes a control packet or other information that causes the receiver circuitry in the SerDes device of the memory integrated circuit 5 to decrease its power consumption, thereby increasing bit error rate of the first SerDes link. In one example, the third SerDes communication causes the SerDes device of the memory integrated circuit 5 to increase (the sixth step) the input impedance of receiver RX 38. This has the effect of decreasing power consumption of the overall first SerDes link and has the effect of increasing bit error rate. The bit error rate is increased in this way until it is within the acceptable range for the first SerDes link. If, however, the updated bit error rate of the first SerDes link is determined to be too large (above the acceptable range for the first SerDes link), then the SerDes device of the processor integrated circuit 3 transmits the third SerDes communication via the first SerDes link to the SerDes device of the memory integrated circuit 5 but this third SerDes communication includes a control packet or other information that causes the SerDes device of the memory integrated circuit 5 to decrease (the sixth step) the input impedance of receiver RX 38. Decreasing the input impedance of receiver RX 38 has the effect of increasing power consumption of the first SerDes link and thereby decreasing bit error rate. The bit error rate of the first SerDes link is decreased in this way until the bit error rate is within the acceptable range for the first SerDes link. Accordingly, the bit rates for the first and second SerDes links are controlled in control loops to maintain them in their acceptable bit rate ranges.

Figure 7A:
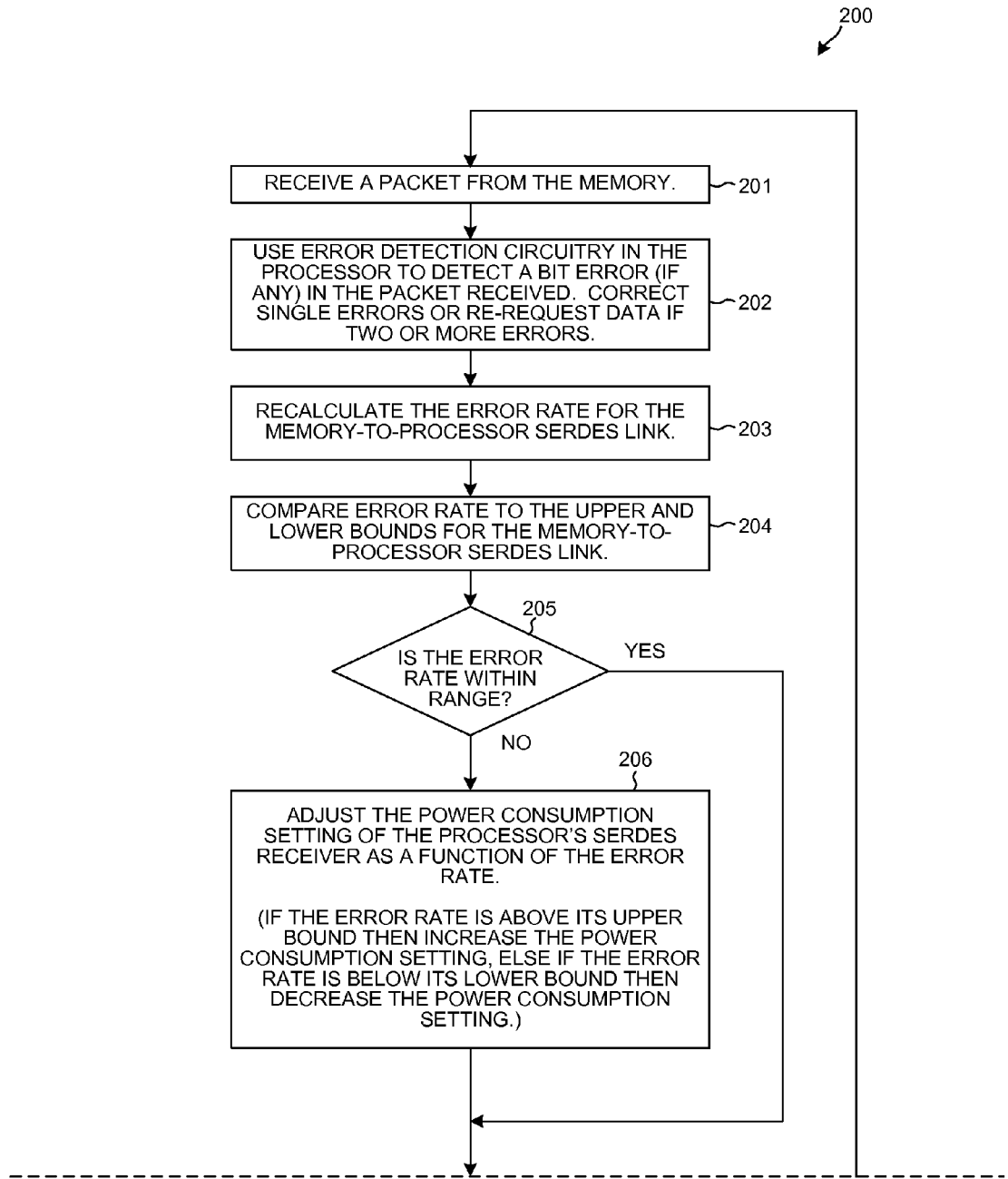
FIG. 7 is a flowchart of a method of operation of the SerDes device 2 in the processor integrated circuit 3 of the system of FIG. 1.
Figure 7B:
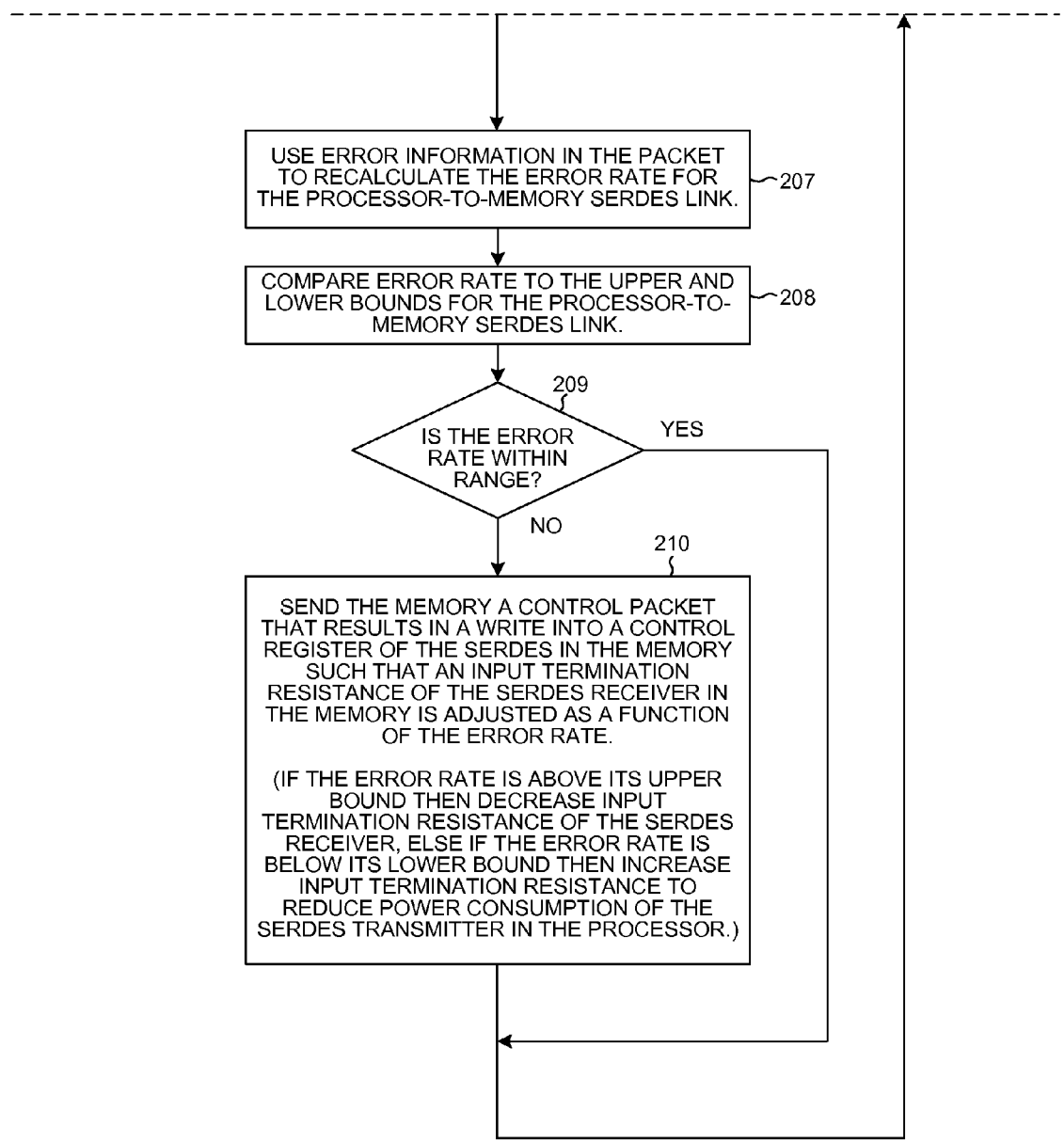

FIG. 7 is a flowchart of a method 200 carried out by the SerDes device 2 in the processor integrated circuit 3. The method involves controlling the bit error rates of the first and second SerDes links 31 and 35. First, a packet is received (step 201) onto the processor integrated circuit 3 via the second SerDes link from the memory integrated circuit 5. Error detection circuitry in the processor integrated circuit 3 is used (step 202) to detect a number of bit errors in the packet received. To maintain data integrity, the controller 6 for the processor integrated circuit 3 also corrects single-bit errors in a packet and re-requests data from the memory if there are two or more errors in a packet. Based on the number of bits received, and the number of bit errors detected, the bit error rate for the second SerDes link 35 is recalculated (step 203) and updated. Controller 6 in the processor integrated circuit 3 then compares (step 204) the updated bit error rate to the upper and lower bounds of the acceptable bit error rate range for the second SerDes link. If the updated bit error rate is within the range (step 205), then step 206 is skipped and the power consumption setting for the SerDes receiver portion 8 of the processor integrated circuit 3 is not changed. If, however, the updated bit error rate is not within the range (step 205), then the power consumption setting for the SerDes receiver portion 8 of the processor integrated circuit 3 is adjusted (step 206) in such as way as to bring the bit error rate back into range. If the updated bit error rate is too high, this adjustment involves increasing power consumption of a part of the SerDes receiver that is limiting bit error rate. If the updated bit error rate is too low, then power consumption to the SerDes receiver is cut until the bit error rate is back in the acceptable range.

The packet received in step 201 contains error information generated by the SerDes device in the memory integrated circuit 5 relating to an earlier SerDes communication across the first SerDes link 31. The error information may, for example, indicate a number of bit errors that were detected by the memory integrated circuit in the earlier SerDes communication across the first SerDes link 31. In step 207, this error information is used to recalculate an error rate for the first SerDes link. The controller 6 in the processor integrated circuit 3 maintains a sum of the total number of bits transferred to the memory integrated circuit 5 across the first SerDes link 31, and the controller 6 uses the error information to keep track of the total number of bit errors in these communications as detected by the memory integrated circuit 5. The resulting updated bit error rate for the first SerDes link 31 is then compared (step 208) to the upper and lower bounds of an acceptable error rate range for the first SerDes link 31. If the updated bit error rate is within the range (step 209), then step 210 is skipped such that the processor integrated circuit 3 does not cause the memory integrated circuit 5 to change the input impedance of the SerDes receiver 38. If, however, the updated bit error rate is not within the range (step 209), then the SerDes device of the processor integrated circuit 3 sends (step 210) the SerDes device of the memory integrated circuit 5 a control packet across the first SerDes link 31, and this control packet causes the input impedance of the SerDes receiver 38 to be adjusted in such as way as to bring the bit error rate back into range. If the updated bit error rate is too high, then the control packet causes the input impedance to be reduced, thereby increasing power consumption of a part of the first SerDes link 31 and decreasing bit error rate. If the updated bit error rate is too low, then the control packet causes the input impedance to be increased, thereby decreasing power consumption of a part of the first SerDes link 31 and increasing the bit error rate. The control packet may, for example, cause a write into a control register (not shown) of the SerDes receiver 38 where the value in the control register determines the input impedance of the SerDes receiver 38.

Figure 8:
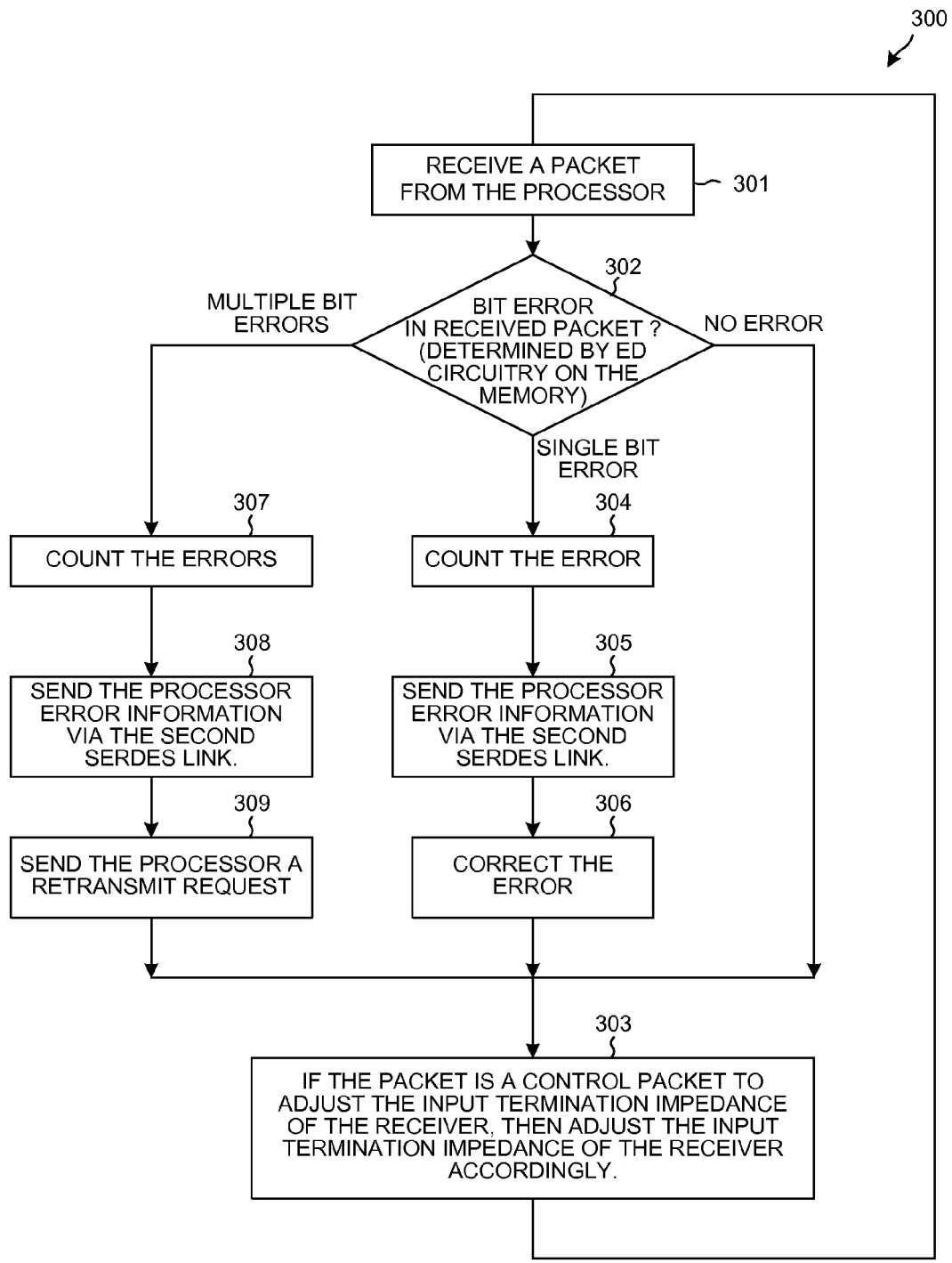
FIG. 8 is a flowchart of a method of operation of the SerDes device 4 in the memory integrated circuit 5 of the system of FIG. 1.

FIG. 8 is a flowchart of a method 300 carried out by the SerDes device 4 in the memory integrated circuit 5. A packet is received across the first SerDes link 31 from the processor integrated circuit 3. The error detection circuitry 43 checks (step 302) the data payload of the packet with a CRC carried in the packet to determine whether there were one or more bit errors in the receiving of the packet. If no error was detected in step 302, then processing proceeds directly to step 303. If the packet is a control packet to adjust the input impedance of the SerDes receiver 38, then the input impedance of the SerDes receiver is adjusted (step 303) accordingly. If, however, one error was detected in step 302, then the controller 9 increments an error count sum (step 304) maintained on controller 9 for the first SerDes link 31 (optional), and sends (step 305) the SerDes device 2 in the processor integrated circuit 3 error information via the second SerDes link 35, where the error information indicates the number of bit errors detected. An error detection and correction scheme is employed wherein if an incoming packet contains a single bit error then the detection circuitry 43 detects the single error and the error correction circuitry 44 corrects the error, whereas if an incoming packet contains two bit errors then the detection circuitry 43 detects the two errors but the error correction circuitry 44 cannot correct both errors. Accordingly, in step 306, the error correction circuitry 44 corrects the single bit error in the incoming packet and uses the data payload as appropriate. If multiple errors were detected in step 302, then processing proceeds to step 307. The error count sum for the first SerDes link 31 is incremented by the number of detected bit errors (step 302), and the SerDes device in memory integrated circuit 5 sends (step 308) the SerDes device 2 in the processor integrated circuit 3 error information via the second SerDes link 35, where the error information indicates the number of bit errors detected. The SerDes device 4 in the memory integrated circuit 5 also sends (step 309) the SerDes device 2 in the processor integrated circuit 3 a retransmit request via second SerDes link 35, where the retransmit request is a request to retransmit the packet that was detected to have multiple errors. The retransmit request may be the same packet that contains the error information of step 308, or the retransmit request may be a different packet.

Figure 9:
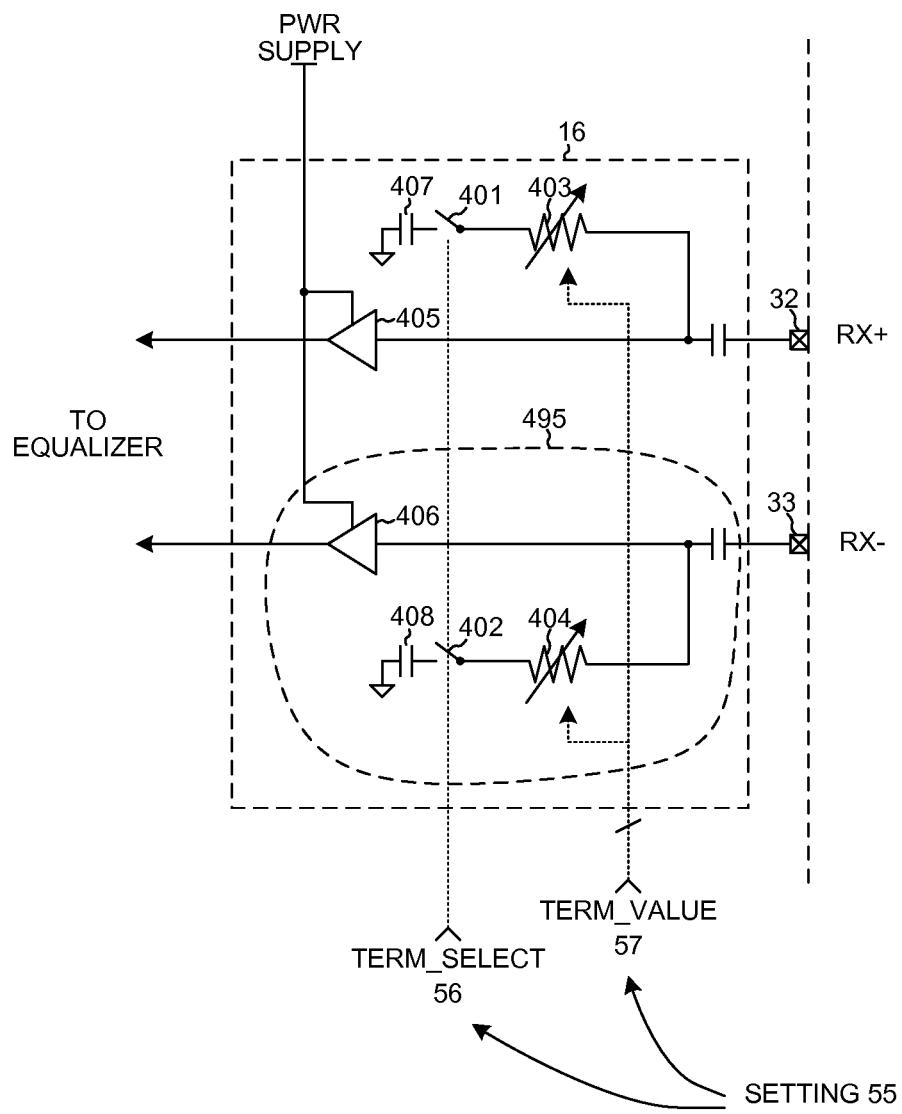
FIG. 9 is a simplified circuit diagram of the SerDes receiver RX 16 of the system of FIG. 1.

FIG. 9 is a more detailed diagram of one example of SerDes receiver 16. SerDes receiver 38 in this example is of identical construction. Terminal RX+ 32 and terminal RX− 33 receive the one gigabit per second bit rate differential incoming signal from conductors 34. The termination input impedance on/off signal TERM_SELECT 56 is a one-bit digital signal and is part of the setting 55, as is the multi-bit digital termination input impedance magnitude control signal TERM_VALUE 57. If TERM_SELECT 56 is a digital logic low then switches 401 and 402 are open as illustrated, whereas if TERM_SELECT 56 is a digital logic high then switches 401 and 402 are closed. If the switches are open, then the impedance looking into the receiver RX 16 is high and is unaffected by the resistances of resistors 403 and 404. The input impedance is the input impedance of the amplifiers 405 and 406. This is a relatively high input impedance. If the switches are closed, then the impedance looking into the receiver RX 16 is lower and is affected by the resistances of resistors 403 and 404 and by the capacitances of capacitors 407 and 408.

Figure 10:
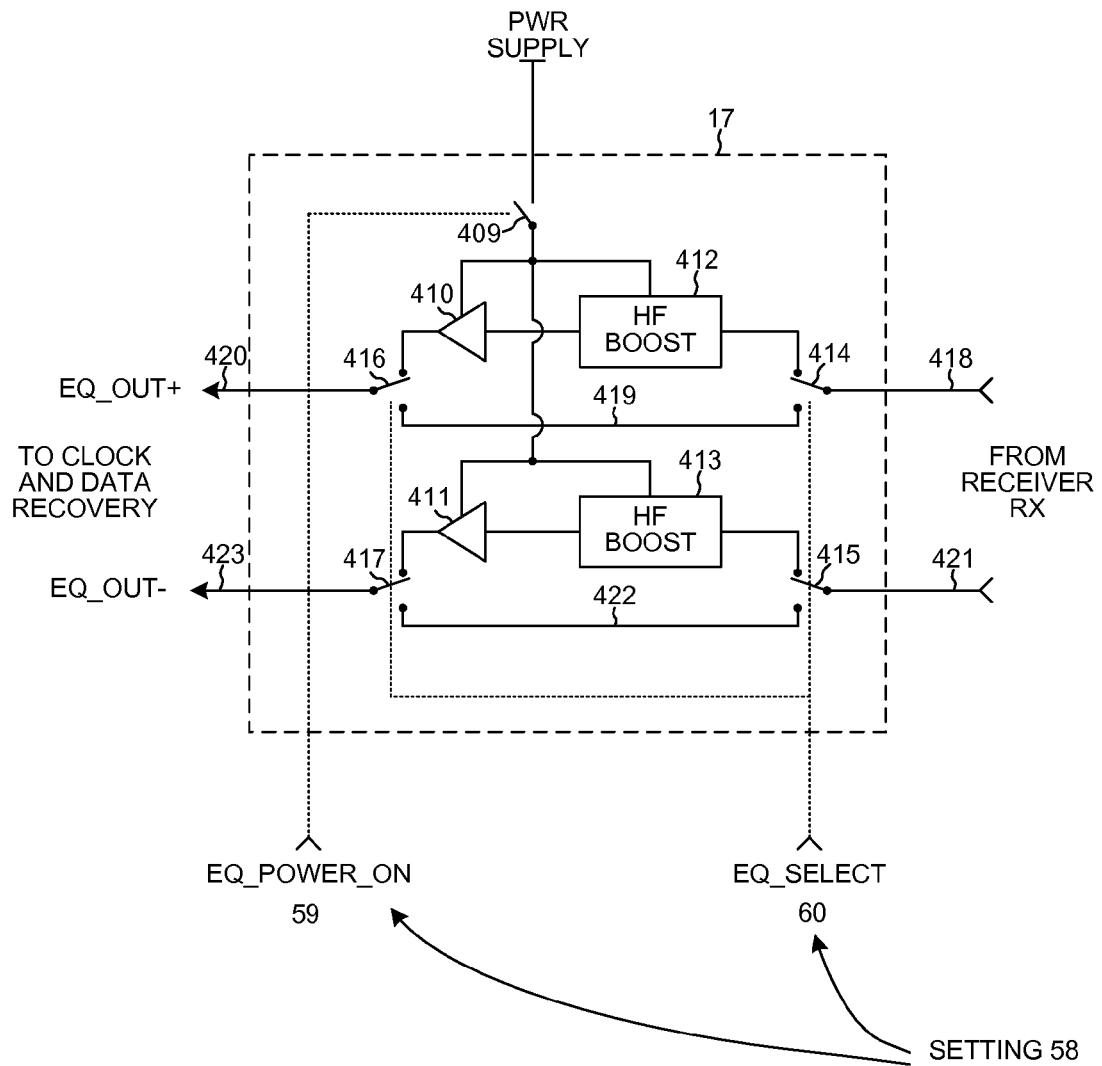
FIG. 10 is a simplified diagram of the equalizer 17 of the system of FIG. 1.

FIG. 10 is a more detailed diagram of one example of equalizer 17. In its lower power mode or setting, the one-bit digital signal EQ_POWER_ON 59 is a digital logic low and switch 409 is open such that the active circuitry 410-413 is unpowered. The one-bit digital signal EQ_SELECT 60 is also a digital logic low and switches 414 and 416 are set such that a signal on input lead 418 bypasses the disabled and unpowered active circuitry 410 and 412 via conductor 419, and passes to output lead 420. Similarly, switches 415 and 417 are set such that a signal on input lead 421 bypasses the disabled and unpowered active circuitry 411 and 413 via conductor 422, and passes to output lead 423. In its higher power mode or setting, EQ_POWER_ON 59 is a digital logic high and switch 409 is closed such that the active circuitry 410-413 is powered. EQ_SELECT 60 is a digital logic high and switches 414 and 416 are in the positions indicated in FIG. 10. A signal on input lead 418 passes through the high frequency boost circuit 412, and then through the amplifier 410, and to output lead 420. A signal on input lead 421 passes through the high frequency boost circuit 413, and then through the amplifier 411, and to output lead 423. The high frequency boost circuits 412 and 413 are circuits that pass lower frequency components of the signal being processed with a smaller amount of amplification (2 dB less gain) as compared to the amount the higher frequency components of the signal are amplified. In this example, the higher frequency components are components of frequencies 700 MHz and higher. The high frequency boost improves receiver performance in situation where the SerDes link 35 is a band limited channel. The control signals EQ_POWER_ON 59 and EQ_SELECT 60 together constitute the setting 58 supplied to the equalizer.

Figure 11:
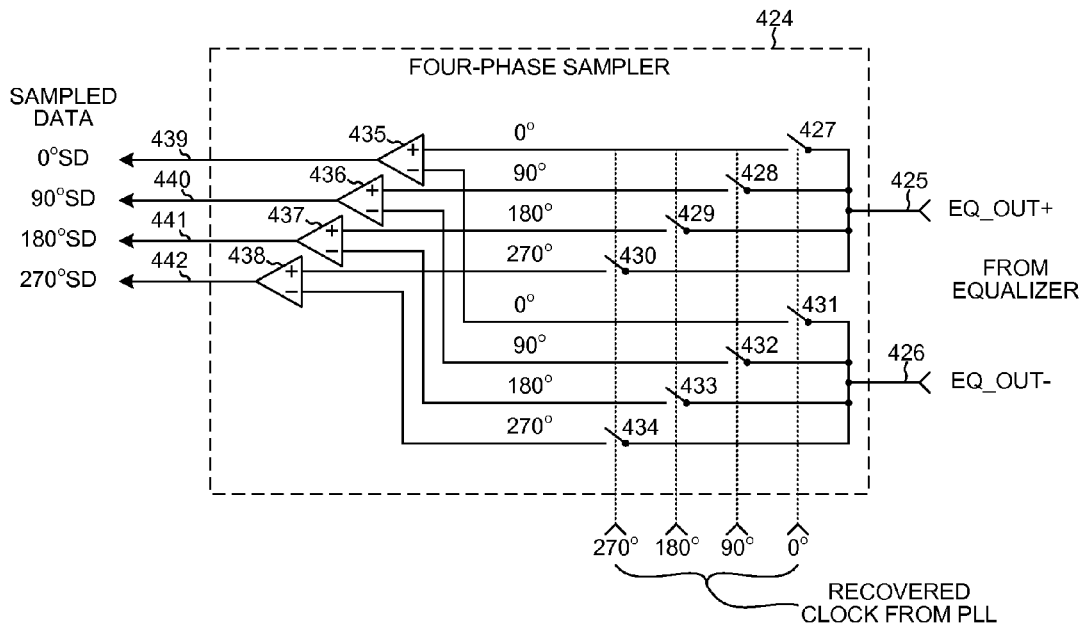
FIG. 11 is a diagram of the four-phase sampler 424 within the CDR circuit 18 of the system of FIG. 1.

FIG. 11 is a simplified diagram of a four-phase sampler portion 424 of the CDR circuit 18 of FIG. 3. Input lead 425 of FIG. 11 is coupled to output lead 420 of FIG. 10. The two leads are parts of the same conductor and node. Similarly, input lead 426 of FIG. 11 is coupled to output lead 423 of FIG. 10. The two leads are parts of the same conductor and node. The signals 0°, 90°, 180° and 270° are four-phase clock signals received from PLL 12. These signals are of a frequency of half the one gigabit per second communication rate. Due to the operation of switches 427-434, the comparators 435-438 quantize the differential signal on input leads 425 and 426 into single-ended digital signals. This quantization occurs at four sample times: zero degrees, ninety degrees, one hundred eighty degrees, and two hundred and seventy degrees. The comparators 435-438 output single-ended sampled data signals 0° SD, 90° SD, 180° SD and 270° SD onto output leads 439-442.

Figure 12:
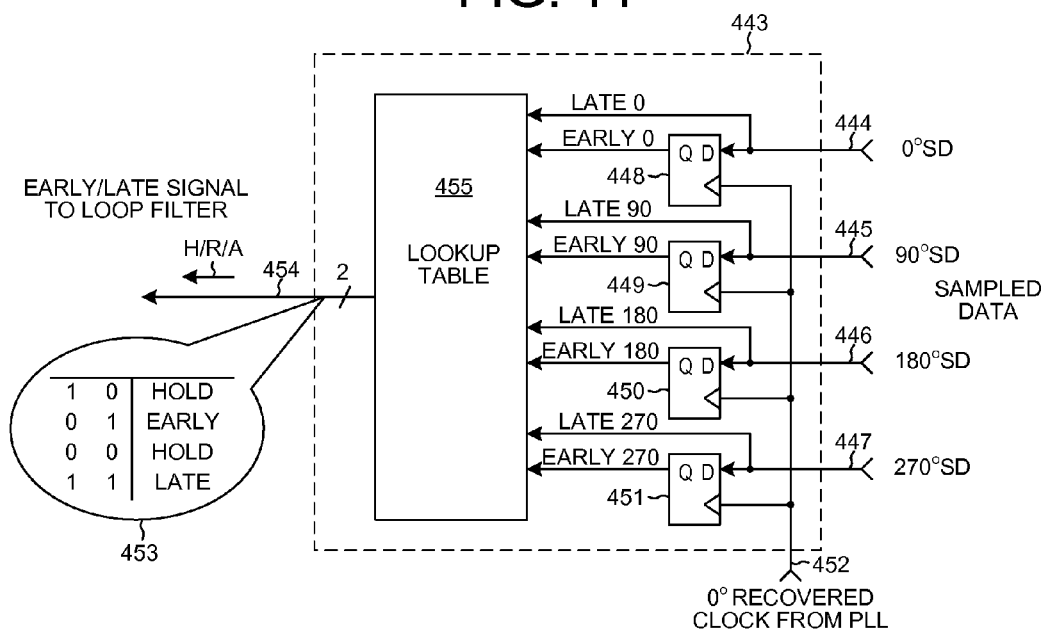
FIG. 12 is a diagram of the early-late detector 443 within the CDR circuit 18 of the system of FIG. 1.

FIG. 12 is a diagram of an early-late detector portion 443 of the CDR circuit 18 of FIG. 3. Input leads 444-447 of the early-late detector portion are coupled to the output leads 439-442 of the four-phase sampler portion 424 of FIG. 11. The incoming sampled data signals 0° SD, 90° SD, 180° SD and 270° SD are stored by flip-flops 448-451 at the time of the rising edge of the signal 0° on conductor 452. This signal "0°" is a clock recovered signal that is output by the circuitry of FIG. 15. The table 453 indicates the meaning of the two-bit value H/R/A (Hold/Retard/Advance) on conductors 454 as output by lookup table 455. The two-bit value H/R/A indicates whether the recovered clock should be advanced in phase, not adjusted in phase, or retarded in phase so that the sampling of the data will be ideal.

Figure 13:
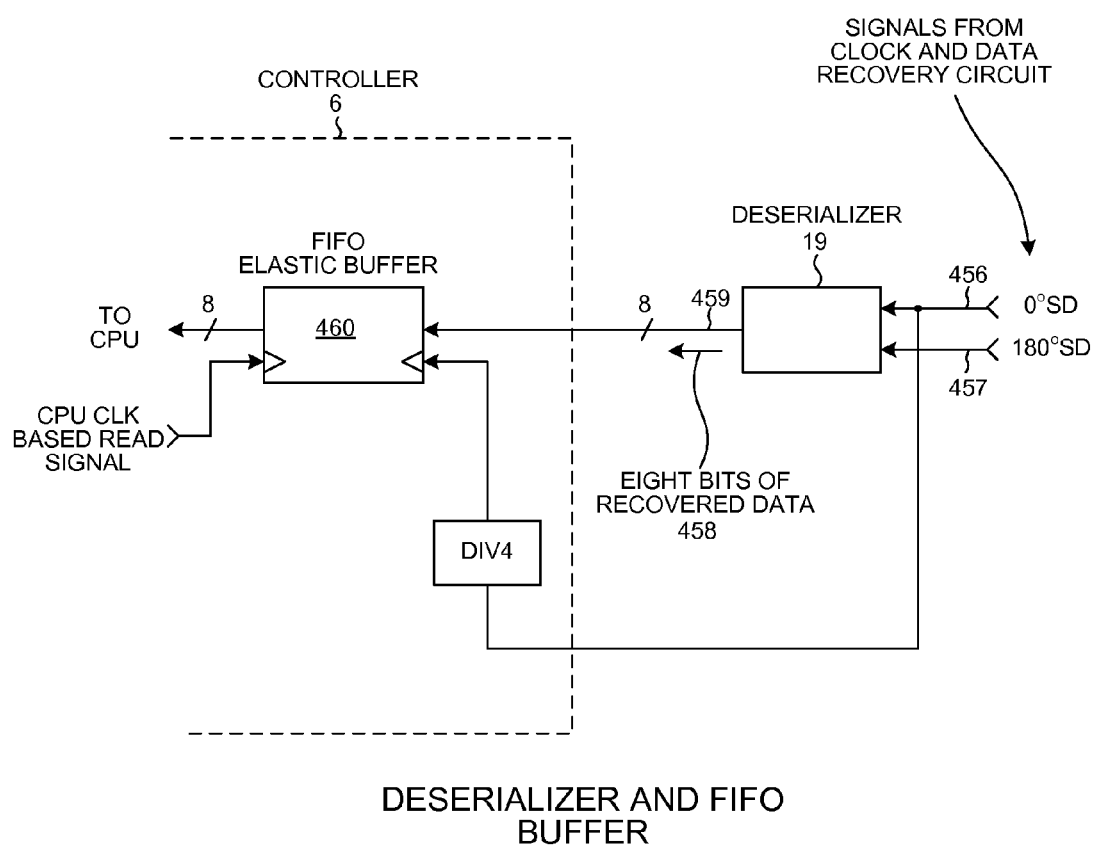
FIG. 13 is a diagram that illustrates how data passes from the deserializer 19 into the controller 6 in the system of FIG. 1.

FIG. 13 is a diagram that illustrates operation of the deserializer 19. The signals 0° SD and 180° SD on input leads 456 and 457 represent the even and odd samples of the data. Signal 0° SD is the signal on output lead 439 of FIG. 11. Signal 180° SD is the signal on output lead 441 of FIG. 11. Deserializer 19 includes a shift register, control circuitry, and a multiplexer. The values of the 0° SD signal and the 180° SD signal are shifted into the shift register in alternating fashion, one after the other, back and forth. The resulting eight-bit parallel output of the shift register at the end of eight of these shift-in operations is the signal 458 on conductors 459. As each successive one of these eight-bit values becomes valid on the output of the shift register, it is pushed into a First-In-First-Out (FIFO) elastic buffer 460 in controller 6. The CPU reads the data out of FIFO elastic buffer 460 via another port. The writing into FIFO 460 by the deserializer 19 and the reading out of the FIFO 460 by the CPU are asynchronous to one another but have the same nominal rate. (It is to be understood that the parallel data passing out of the deserializer and into the controller and the parallel data passing from the controller and into the serializer can be a number of bits other than eight bits. The eight-bit parallel data described here is only one example).

Figure 14:
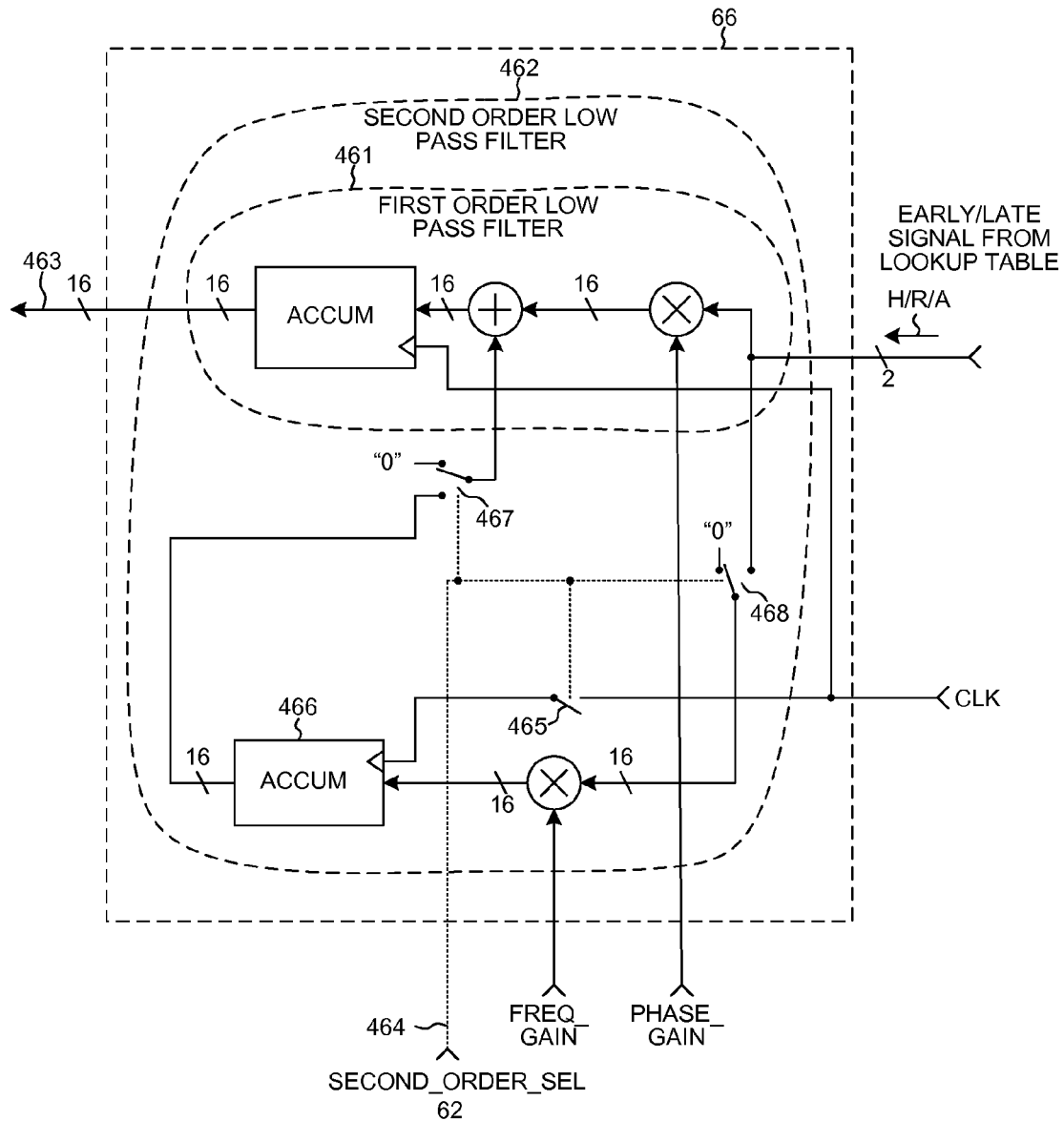
FIG. 14 is a diagram of the loop filter 66 within the CDR circuit 18 of the system of FIG. 1.

FIG. 14 is a diagram of the loop filter 66 in the CDR circuit 18 of FIG. 3. The loop filter is a digital filter that filters the stream of two-bit digital values H/R/A from the early-late detector 443 of FIG. 12. If only the circuitry in the dashed line 461 is employed, then the digital filter is configured to be a first order low pass filter. If all the circuitry within dashed line 462 is employed, then the digital filter is configured to be a second order low pass filter. Regardless of whether the loop filter 66 is configured to be a first order low pass filter or a second order low pass filter, the output of the filter appears as a stream of 16-bit values on conductors 463. The SECOND_ORDER_SEL signal 62 on input lead 464 is a part of setting 61 that is supplied to the CDR circuit 18 in FIG. 3. When the second order filter is disabled the clock signal CLK is blocked (as represented by switch 465 being open) from clocking the accumulator 466, whereas when the second order filter is enabled the clock signal CLK is not gated off Because the circuit is digital, power consumption is reduced because static power consumption of the digital circuit is low. When the second order filter is disabled, the switches 467 and 468 are in the positions illustrated, whereas when the second order filter is enabled the switches 467 and 468 are in their opposite positions. The sixteen-bit signal on conductors 463 is a slowly changing signal due to the low pass filtering effect of the loop filter.

Figure 15:
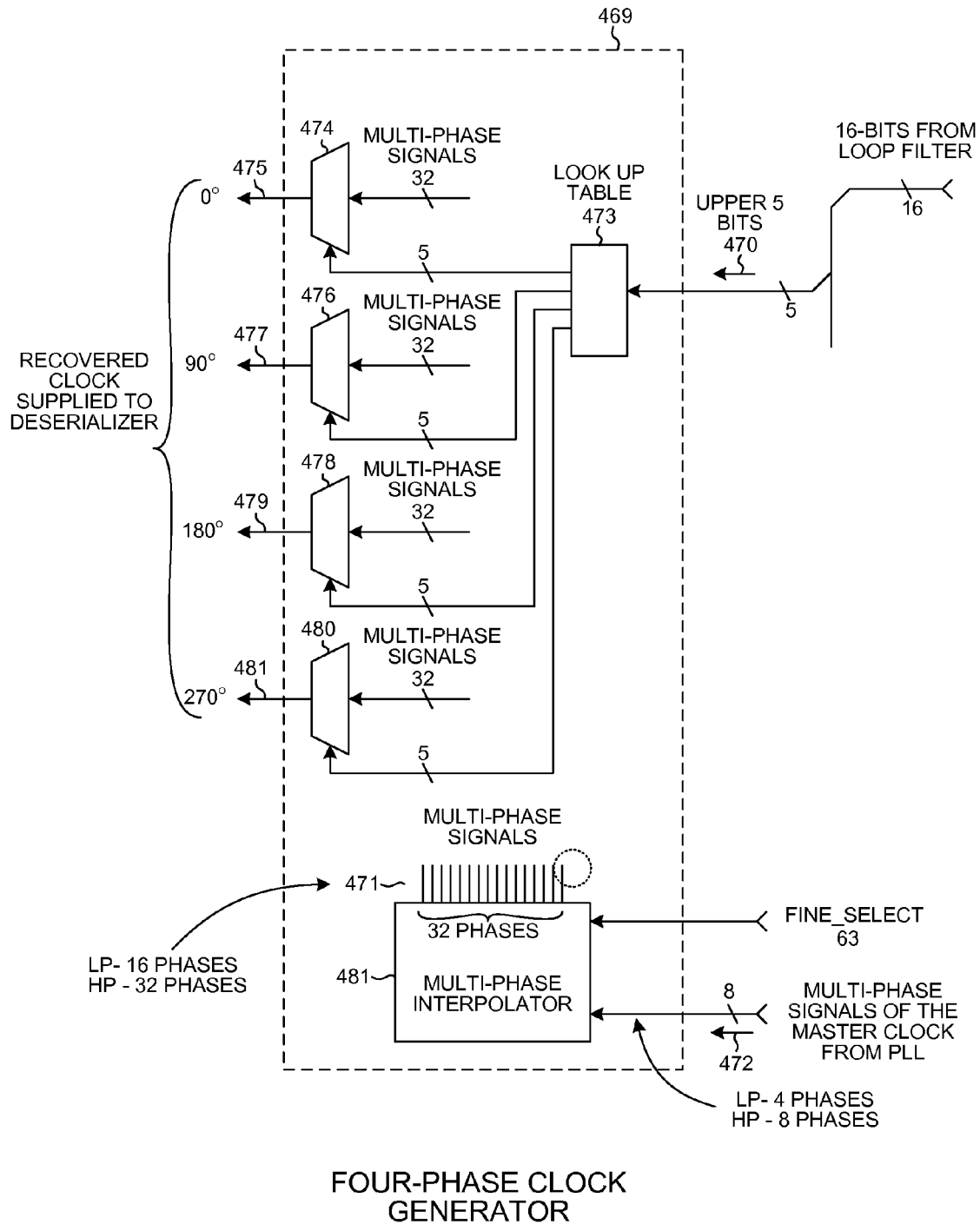
FIG. 15 is a diagram of the four-phase clock generator 469 within the CDR circuit 18 of the system of FIG. 1.

FIG. 15 is a diagram of a four-phase clock generator portion 469 of the CDR 18 of FIG. 3. The five most significant bits 470 of each sixteen-bit value from loop filter 66 are used to select certain ones of the multi-phase signals 471 of the 500 MHz master clock 472 received from the PLL. Arrow 472 represents either four phases of the 500 MHz master clock signal in a lower power mode, or eight phases of the 500 MHz master clock in a higher power mode. There are eight signal conductors, but in the lower power mode there is no signal driven onto four of the conductors. In the lower power mode there are sixteen different multi-phase signals 471 (each pair of sixteen conductors carries a different phase signal in this mode), whereas in the higher power mode there are thirty-two different multi-phase signals 471 (each of the thirty two conductors carries a different phase signal in this mode).

To select the proper ones of the multi-phase signals 471, the five most significant bits 470 of each sixteen-bit value received from the loop filter are supplied to a lookup table 473. The output of lookup table 473 determines which one of the multi-phase signals 471 will be supplied by multiplexer 474 as the 0° signal on conductor 475, which one of the multi-phase signals 471 will be supplied by multiplexer 476 as the 90° signal on conductor 477, which one of the multi-phase signals 471 will be supplied by multiplexer 478 as the 180° signal on conductor 479, and which one of the multi-phase signals 471 will be supplied by multiplexer 480 as the 270° signal on conductor 481. Lookup table 473 provides a mapping from the incoming five-bit value 470 that indicates whether the multi-phase signal selected for each of the 0°, 90°, 180° and 270° is to be advanced, held, or retarded. The five-bit select signals that control the multiplexers 474, 476, 478 and 480 select their respective multiplexers such that the ones of the multi-phase signals selected by the multiplexers shift together either forward in phase, or hold in phase, or are shifted backward in phase. This adjustment of the phase of the four signals on conductors 475, 477, 479 and 481 results in either an advancing, a holding, or a retarding of the location of the sampling time within each bit time of the incoming data.

There are two modes of the four-phase clock generator portion 469, a fine mode and a coarse mode. The fine mode is a higher power mode, whereas the coarse mode is a lower power mode. Which one of the two modes is being used is determined by the one-bit FINE SELECT input signal 63. If the fine mode is selected, then thirty-two phase signals are needed and the multiplexers 474, 476, 478 and 480 are made to select one of thirty-two phases. The multi-phase interpolator 481 receives eight phases 472 from the PLL and interpolates therefrom the thirty-two phases for a finer phase resolution. Similarly, the lookup table 473 controls each of the multiplexers to select one of thirty-two possible input signals. In the fine mode, each of the thirty-two conductors coming from the multi-phase interpolator 481 carries a signal of a different phase. If the coarse mode is selected, then each of the multiplexers 474, 476, 478 and 480 selects only one of sixteen different phases. The multi-phase interpolator 481 receives four phases from PLL and interpolates therefrom sixteen phases supplied to the multiplexers. In the coarse mode, each successive pair of the thirty-two conductors coming from the multi-phase interpolator 481 carries a signal of a different phase so there are only sixteen different phases provided by the multi-phase interpolator 481.

Figures 16, 17:
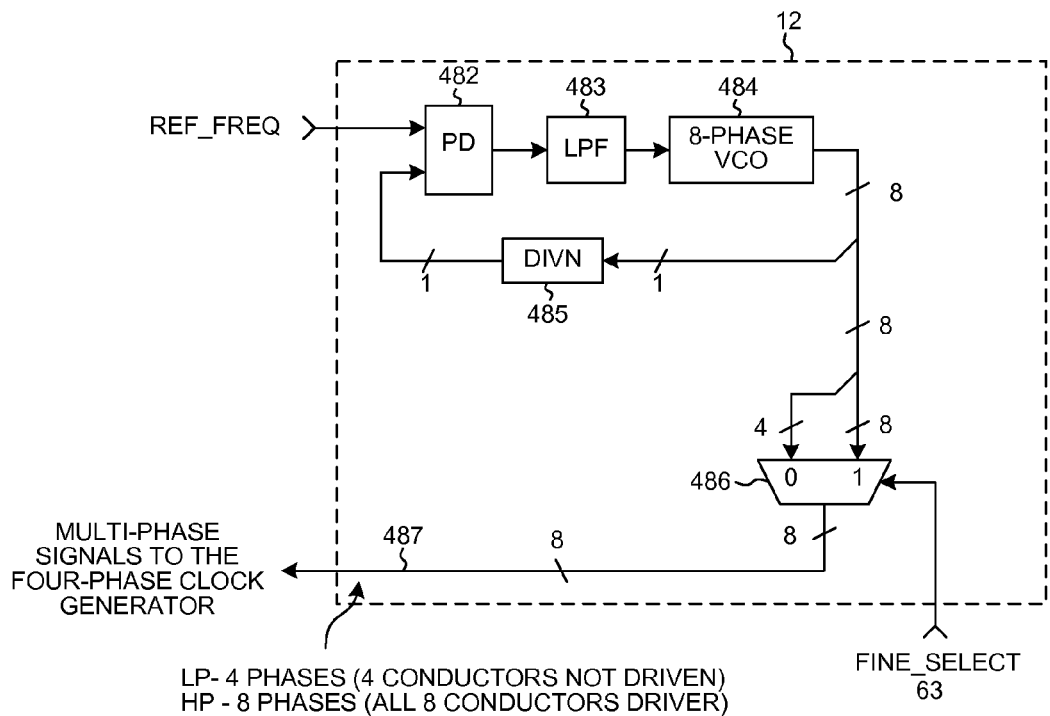
FIG. 16 is a diagram of the PLL 12 of the system of FIG. 1.
FIG. 17 is a table that shows the signals output from PLL 12 onto conductors 487.

FIG. 16 is a simplified diagram of the PLL 12. The PLL 12 includes a phase detector 482, a loop filter 483, an eight-phase VCO 484, and loop divider 485. The incoming reference clock REF_FREQ may, for example, be obtained from a crystal oscillator or other high precision reference. VCO 484 rather than just outputting one signal of the controlled frequency, VCO 484 outputs eights versions of the signal at eight different evenly spaced phases. These eight signals are supplied to a clock blocking circuit 486. If the FINE SELECT signal 63 is selecting the fine mode, then the eight versions of the clock signal are all passed through the clock blocking circuit 486 and onto eight conductors 487. These eight conductors 487 supply the eight versions of the master clock to the four-phase clock generator 469 of FIG. 15 as described above in the fine mode. If, however, the FINE SELECT signal 63 is selecting the coarse mode, then every other one of the eight conductors 487 coming out of the clock blocking circuit 486 is not driven. Only four different phase signals are driven out of the clock blocking circuit 486 and consequently power is saved as compared to the fine mode of operation where all eight conductors are driven.

FIG. 17 is a table that illustrates the signals output from PLL 12 onto conductors 487. The middle column of the chart represents fine mode operation. All eight conductors are driven with clock signals, and each signal has a different phase. The rightmost column of the chart represents coarse mode operation. Only half of the eight conductors are driven with clock signals.

Figure 18:
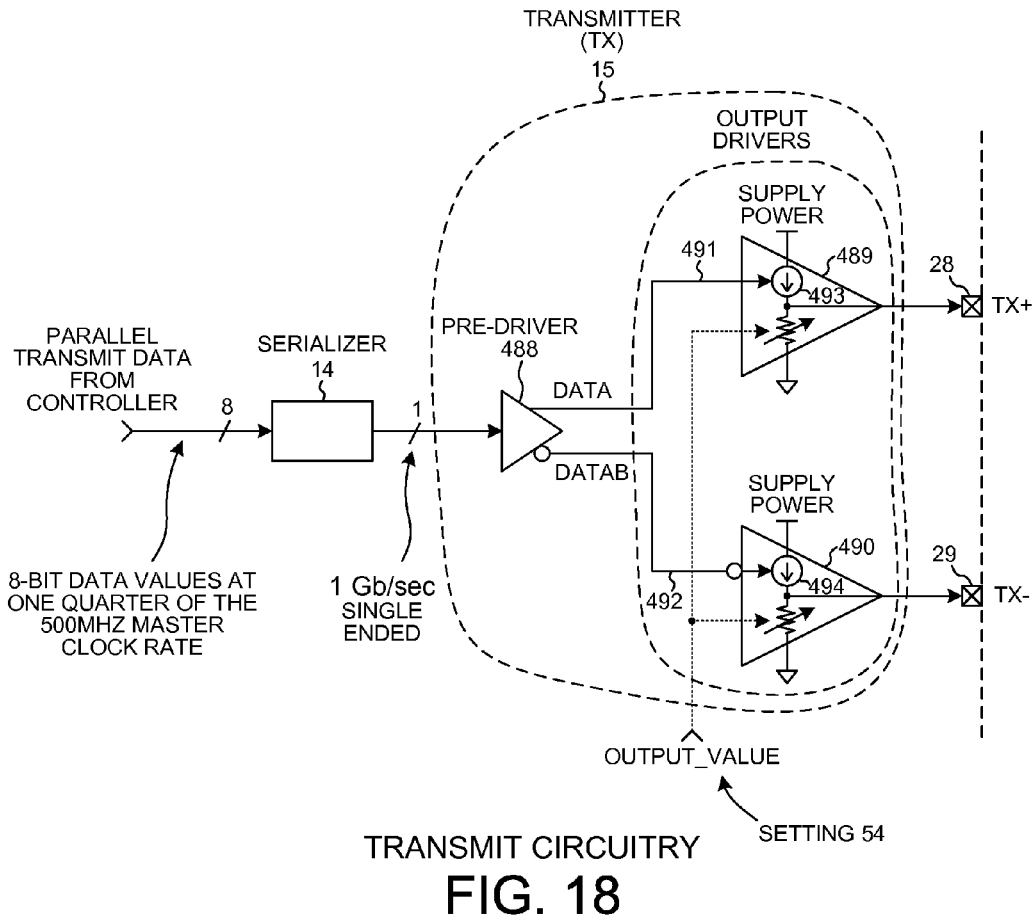
FIG. 18 is a simplified diagram of the transmit circuitry of the system of FIG. 1.

FIG. 18 is a simplified diagram of the transmit circuitry. Controller 6 supplies eight-bit parallel data for transmission. Eight-bit values are supplied at the rate of the 125 MHz. Serializer 14 performs the inverse of the deserializing operation described above in connection with deserializer 19. Serializer 14 generates an even signal and an odd signal from the incoming data stream, and these even and odd signals are then used to up sample the data into a single serial stream. The resulting serial stream of up sampled data has an output data rate of one gigabit per second. Pre-driver 488 is an analog amplifier that takes the incoming single-ended stream of digital bits and from this stream generates two differential analog output signals. One signal is supplied to output driver 489 via conductor 491. The other signal is supplied to output driver 490 via conductor 492. Output drivers 489 and 490 have digitally controlled output impedances. The lower the output impedance, the stronger the signal that is driven but the more power is consumed. The multi-bit digital signal OUTPUT_VALUE determines this output impedance and is setting 54 shown in FIG. 3.

Each of the current source symbols 493 and 494 is a controlled current source. The current source is on and is sourcing a current-limited amount of current when the data input signal has a digital logic one value, but the current source is off and is not sourcing any current when the data input signal has a digital logic zero value. The maximum amount of current that the current source sources when on is determined by the OUTPUT_VALUE signal. When a signal on one of the terminals TX+ or TX− is to transition high, the associated current source attempts to source its current-limited amount of current. This causes the voltage on the output terminal to rise until the voltage reaches the power supply voltage (SUPPLY POWER), at which point the current source is voltage limited and supplies little current. When the signal on the terminal is to transition low, then the associated current source is turned off such that the voltage on the output terminal is pulled down to ground potential by the pull down impedances in the transmitter and in the receiver on the other end of the SerDes link.

Figure 19:
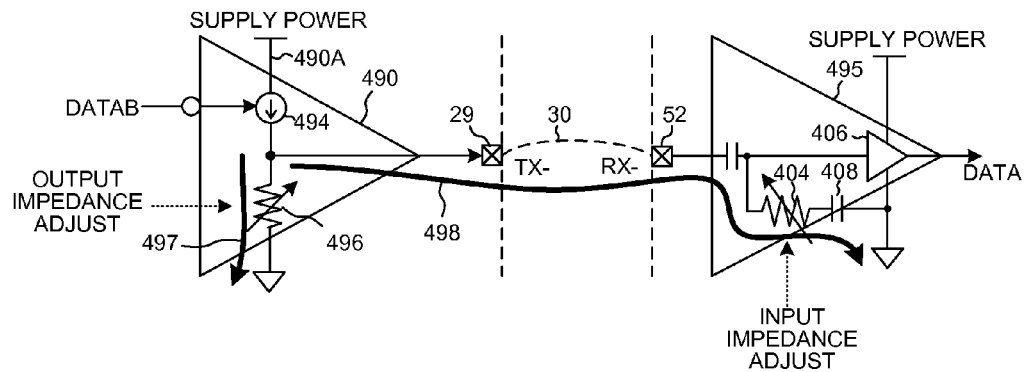
FIG. 19 is a diagram that shows how changing the input impedance of a SerDes receiver affects power consumption of a SerDes transmitter on the other end of the SerDes link.

FIG. 19 is a diagram that illustrates how decreasing the input impedance of a SerDes receiver results in reducing power consumption of the SerDes driver of the transmitter. Buffer 490 of the SerDes transmitter 15 of FIG. 1 is shown to the left in FIG. 19. Half 495 of the SerDes receiver 38 of FIG. 1 is shown to the right in FIG. 19. When the signal DATAB transitions to a digital logic low, then current source 494 is turned on. The voltage on terminal TX− is made to rise to transition high. The current sourced by current source 494 is split between a current path 497 to ground through impedance 496 in the transmitter, and a current path 498 to ground through resistance 404 in the receiver 495. The current source 494 is powered from a fixed supply voltage on supply conductor 490A, and the current source 494 is capable of sourcing a relatively large amount of current, so in the circuit of FIG. 19 the amount of current sourced by current source 494 is actually limited by resistance 496 of the transmitter and by resistance 404 of the receiver. Accordingly, reducing resistance 404 causes more current to be drawn from current source 494 of the transmitter. Conversely, increasing resistance 404 causes less current to be drawn from current source 494 of the transmitter. Increasing the input impedance of the receiver is said to decrease power consumption in the transmitter. Conductor 30 has an impedance to ground (for example, fifty ohms to ground) often referred to as the line impedance. Rather than matching the output impedance of the transmitter and the input impedance of the receiver to the line impedance as is conventional, the input impedance of the receiver is deliberately made to be higher than the line impedance in order to reduce power consumption in the overall system. The degree of unmatching is controlled to keep the bit error rate within the acceptable range, where the lower bound of the acceptable range is substantially greater than zero. The SerDes link is not operated to minimize bit errors but the bit error rate is acceptable and power consumption is reduced as compared to a situation where the transmission line is conventionally terminated. By providing error detection and correction circuitry in the SerDes receiver that can detect and correct single bit errors, the need to retransmit to successfully communicate data across the SerDes link is reduced or eliminated despite the fact that the lower bound of the acceptable bit error rate range is set to be substantially greater than zero.

Figures 20, 21:
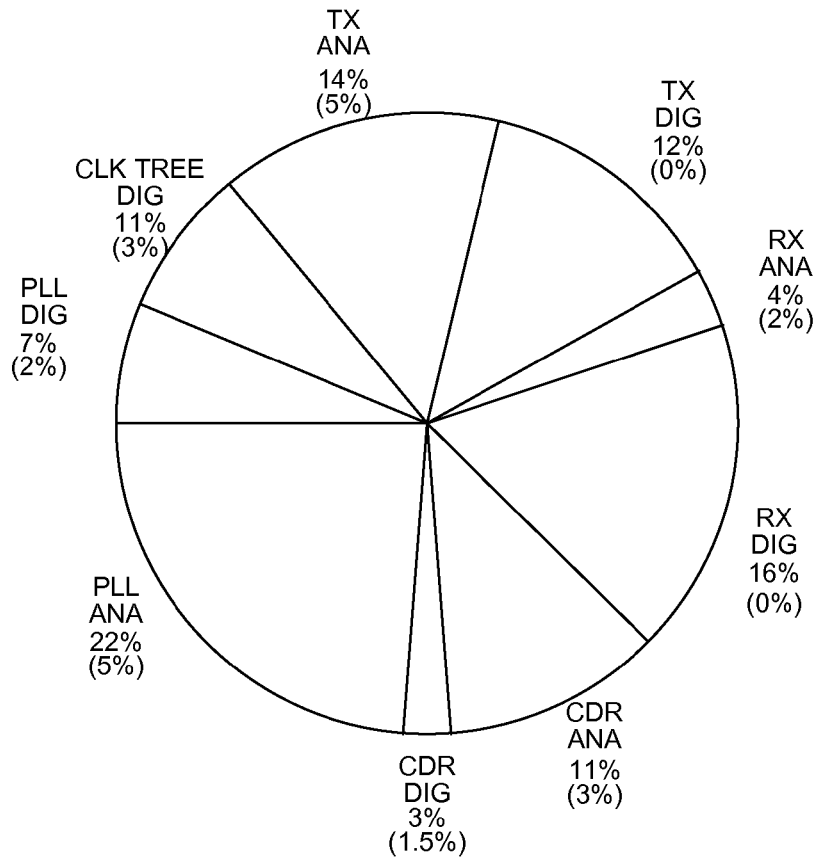
FIG. 20 is a pie chart that shows the breakdown of power consumption in the SerDes device 2 in the processor integrated circuit 3 of the system of FIG. 1.
FIG. 21 is a table that shows total power consumption of the SerDes device 2 in the higher power mode and in the lower power mode.

FIG. 20 is a pie chart that shows the breakdown of power consumption in the SerDes device 2 in processor integrated circuit 3. For each section of the chart, the percentage number that is not in parenthesis indicates the percentage of total power consumption consumed when operating in the higher power mode whereas the percentage number that is enclosed by parenthesis indicates the percentage of total power consumption that is saved by operating in the lower power mode. For example, "RX ANA 4% (2%)" indicates that in the lower power mode the analog portion of the SerDes receiver RX consumes four percent of total power consumption (of the entire SerDes device 2). The 2% of "RX ANA 4% (2%)" indicates that in the lower power mode two percent of overall total power consumption (total power consumption of entire SerDes device 2) is saved in the analog portion of the SerDes receiver RX by operating it in the lower power mode. In the chart, "DIG" means the digital portion of a circuit and "ANA" means the analog portion of a circuit. "RX" means the SerDes receiver RX; "CDR" means the clock and data recovery circuitry; "PLL" means the phase-locked loop; "CLK TREE" means the active clock buffers and interconnect that distribute each clock phase to their respective destinations and "TX" means the SerDes transmitter TX. In this embodiment, more power consumption savings is possible in the SerDes receiver of a SerDes link than is possible in the SerDes transmitter portion of the SerDes link.

FIG. 21 is a table that shows total power consumption of the SerDes device 2 in the higher power mode and in the lower power mode. The "−20.5%" notation for the lower power mode equalizer on means that power consumption is 20.5% less than in the higher power mode.

Figure 22:
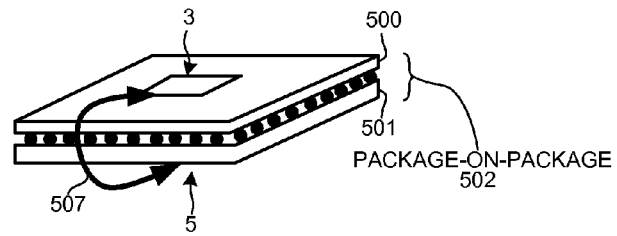
FIG. 22 shows an example where a SerDes link is a wideband channel.
Figure 23:
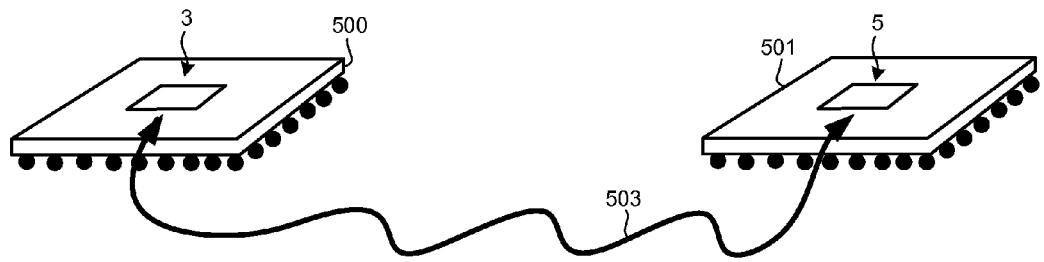
FIG. 23 shows an example where a SerDes link is a slightly band limited channel.
Figure 24:
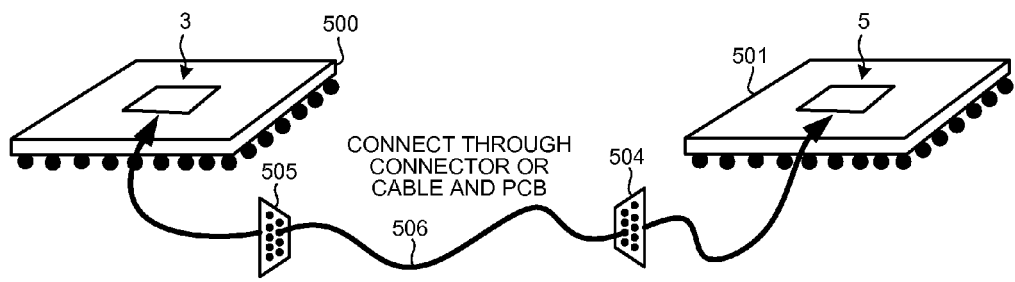
FIG. 24 shows an example where a SerDes link is a significantly band limited channel.

FIGS. 22-24 illustrate examples where SerDes links between the processor integrated circuit 3 and the memory integrated circuit 5 have different amounts of band limiting. FIG. 22 shows an example where the SerDes link is a wideband channel. The heavy double headed arrow 507 represents the wideband channel. The processor integrated circuit 3 is in a first package 500 and the memory integrated circuit 5 is in a second package 501 of a POP (Package-On-Package) assembly 502. The channel extends from one integrated circuit, through its package, through bond balls of the POP, into another package, and to the other integrated circuit. Bit error rate due to band limiting in the channel is not present. High frequency boost of the equalization is therefore disabled, and all other power saving features described above are employed dynamically to reduce power consumption.

FIG. 23 shows an example where the SerDes link is a slightly band limited channel. The integrated circuits 3 and 5 are packaged, and the packages 500 and 501 are mounted on a PCB (Printed Circuit Board) such that the SerDes link extends from one integrated circuit, through its package, through a trace and conductors 503 on the PCB, through another package, and to the other integrated circuit. High frequency boost of the equalization is therefore enabled and used dynamically, and all other power saving features described above are employed dynamically to reduce power consumption.

FIG. 24 shows an example where the SerDes link is a significantly band limited channel. The memory integrated circuit 5 is in a package 501 that is a part of a memory stick. The memory stick plugs into a connector on a motherboard PCB. The connector symbol 504 in the diagram represents this connector. The processor integrated circuit 3 is in a package 500 and this package 500 is in a socket that in turn is mounted to the PCB. The socket is represented by connector symbol 505. The SerDes link 506 extends from the processor integrated circuit 3, through its package 500, through the socket 505, through the PCB, through the memory stick connector 504 on the PCB, into the memory stick, through the package 501 of the memory integrated circuit, and to the memory integrated circuit 5. High frequency boost of the equalization is therefore enabled and used dynamically, and all other power saving features described above are employed dynamically to reduce power consumption.

In a first example, the CPU 25 of the processor integrated circuit 3 upon power up and initialization reads configuration information (information indicative of channel type and/or characteristics), and from that configuration information determines its channel environment. Based on its determined knowledge of the environment, the CPU 25 configures the SerDes controller via bus mechanism 27 to be in the appropriate power consumption saving mode. Symbol 27 does not just represent a single parallel bus of some specific bus width, but rather more generally represents a bus mechanism that can involve one or more buses and other circuitry. In a second example, the CPU and SerDes controller use detected bit error rate to detect channel type and to configure the SerDes low power circuitry automatically to be in the appropriate power consumption mode for the channel type detected. This automatic configuration allows the same SerDes interface design to be employed in different types of products and systems without requiring the reading of special configuration information. This automatic configuration also allows optimized performance (optimal power consumption to bit error rate tradeoff), from unit to unit, across manufacturing variations of a single product. The SerDes interface of a single unit can automatically reconfigure itself over time as the unit operates to optimize performance (optimal power consumption to bit error rate tradeoff) to accommodate operating parameters that change over time and to accommodate changes in the operating environment of the unit.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. In one example, a set of processor executable instructions is in memory 26 of FIG. 1. An execution of that set of instructions causes controller 6 to configure SerDes receiver 8 to balance bit error rate and power consumption as set forth above. In another example, controller 6 includes a memory that stores instructions. A processor within controller 6 executes these instructions and causes the configuration of the SerDes receiver.

Although certain specific embodiments are described above for instructional purposes, the teachings of this patent document have general applicability and are not limited to the specific embodiments described above. The term lower power mode and the term higher power mode are used above as examples of two possible power modes, but it is to be understood that each portion of the SerDes receiver and the SerDes transmitter described above as having a lower power mode and a higher power mode can actually have many different power modes, the lower power mode and the higher power mode being just two of those. The overall SerDes receiver or the overall SerDes transmitter likewise might be said to have a lower power mode and a higher power mode, but it is to be understood that each of these may actually have multiple different power modes. For example, in the SerDes receiver 8, the power consumption setting 53 determines the power mode of the SerDes receiver. Accordingly, various modifications, adaptations, and combinations of the various features of the described specific embodiments can be practiced without departing from the scope of the claims that are set forth below.

What is claimed is:

1. A method comprising:
using a (Serializer/Deserializer) SerDes circuit in a communication of information between a first SerDes device and a second SerDes device across a SerDes link comprising a first SerDes link and a second SerDes link, wherein the SerDes circuit is located within the first SerDes device and is taken from the group consisting of: a SerDes transmitter that transmits information across the first SerDes link, and a SerDes receiver that receives information from the second SerDes link; and
controlling a power consumption of the SerDes receiver in the first SerDes device such that an error rate for transmissions from the second SerDes device to the first SerDes device across the first SerDes link is substantially maintained between a lower error rate bound and an upper error rate bound, and when the error rate for transmissions from the second SerDes device to the first SerDes device remains outside the lower error rate bound and the upper error rate bound, the first SerDes device is configured to transmit an indication to the second SerDes device to alter power consumption in the second SerDes device.

2. An apparatus comprising:
a controller operatively coupled to a (Serializer/Deserializer) SerDes circuit, wherein the SerDes circuit is adapted to communicate information between a first SerDes device and a second SerDes device across a SerDes link comprising a first SerDes link and a second SerDes link, wherein the controller is located within the first SerDes device and is adapted to control a power consumption of the SerDes circuit such that an error rate of the SerDes link is substantially maintained between a lower error rate bound and an upper error rate bound, and when the error rate for transmissions from the second SerDes device to the first SerDes device remains outside the lower error rate bound and the upper error rate bound, the first SerDes device is configured to transmit an indication to the second SerDes device to alter power consumption in the second SerDes device.

3. The apparatus of claim 2, wherein the SerDes link extends between the first and second SerDes devices.

4. The apparatus of claim 2, wherein the controller and the SerDes circuit are parts of the first SerDes device.

5. A method comprising:
(a) determining an error rate of a (Serializer/Deserializer) SerDes link, wherein information passing across the SerDes link is received by a SerDes receiver; and
(b) controlling a power consumption setting of the SerDes receiver such that the error rate is substantially maintained between a lower error rate bound and an upper error rate bound,
wherein when the error rate for transmissions received by the SerDes receiver remains outside the lower error rate bound and the upper error rate bound, the first SerDes receiver is configured to transmit an indication across the SerDes link to a further SerDes device to alter power consumption in the further SerDes device.

6. The method of claim 5, wherein the determining of (a) and the controlling of (b) occur in a battery-powered mobile communication device, and wherein the SerDes link is disposed in the battery-powered mobile communication device.

7. The method of claim 5, wherein the SerDes link extends from a first integrated circuit in a battery-powered mobile communication device to a second integrated circuit in the battery-powered mobile communication device.

8. The method of claim 5, wherein the determining of (a) and the controlling of (b) are performed by a first integrated circuit that includes the SerDes receiver, wherein the information passing across the SerDes link is received from a SerDes transmitter that is a part of a second integrated circuit, wherein the first integrated circuit includes a Central Processing Unit (CPU), wherein the second integrated circuit includes a memory, the method further comprising:
accessing the memory of the second integrated circuit using the SerDes receiver of the SerDes link, wherein the CPU of the first integrated circuit performs said accessing.

9. The method of claim 5, wherein the determining of (a) and the controlling of (b) are performed by an integrated circuit, wherein the integrated circuit includes the SerDes receiver, and wherein the determining of (a) involves:
receiving information via the SerDes receiver, wherein the information includes a data portion and an error detection code portion; and
using an error detection circuit on the integrated circuit to detect one or more bit errors in the data portion using the error detection code portion.

10. The method of claim 9, wherein the error detection code portion is taken from the group consisting of: an error correction code, an error detection and correction code, and a CRC (Cyclic Redundancy Code) code.

11. The method of claim 9, wherein the determining of (a) further involves:
maintaining a sum of a number of detected bit errors; and
maintaining a sum of a number of bits received without error.

12. The method of claim 5, wherein the SerDes receiver includes a loop filter, and wherein the power consumption setting comprises a setting of the loop filter.

13. The method of claim 5, wherein the SerDes receiver includes a digital filter, and wherein the power consumption setting is a setting that prevents a digital clock signal from being supplied to a portion of the digital filter.

14. The method of claim 5, wherein the SerDes receiver includes a clock and data recovery circuit, and wherein the power consumption setting comprises a setting of the clock and data recovery circuit.

15. The method of claim 5, wherein the SerDes receiver includes an equalizer, and wherein the power consumption setting comprises a setting of the equalizer.

16. The method of claim 5, wherein the SerDes receiver includes an equalizer, and wherein the power consumption setting comprises a setting that enables a high frequency boost of the equalizer.

17. The method of claim 5, wherein the SerDes receiver includes a Phase-Locked Loop (PLL) that outputs a multi-phase clock signal, and wherein the power consumption setting comprises a setting of the PLL.

18. The method of claim 5, wherein the SerDes receiver has an input impedance, and wherein the power consumption setting comprises a setting that determines the input impedance of the SerDes receiver.

19. A method comprising:
(a) determining an error rate of a first (Serializer/Deserializer) SerDes link, wherein information passing across the first SerDes link is received by a SerDes receiver; and
(b) controlling a power consumption setting of the SerDes receiver such that the error rate is substantially maintained between a lower error rate bound and an upper error rate bound,
wherein when the error rate for transmissions received by the SerDes receiver remains outside the lower error rate bound and the upper error rate bound, the first SerDes receiver is configured to transmit an indication across the SerDes link to a further SerDes device to alter input impedance in the further SerDes device.

20. The method of claim 19, wherein the determining of the error rate in (a) is performed on a first integrated circuit, and wherein the SerDes receiver is a part of a second integrated circuit.

21. The method of claim 20, wherein the first integrated circuit performs the controlling of (b) by transmitting a packet to the second integrated circuit via the first SerDes link, wherein the packet transmitted to the second integrated circuit includes the input impedance setting, and wherein the input impedance setting is supplied to the SerDes receiver of the second integrated circuit.

22. The method of claim 21, wherein the packet is a control packet.

23. The method of claim 19, wherein the information passing across the first SerDes link in (a) is output by a SerDes transmitter of a first integrated circuit, wherein the SerDes receiver that receives the information in (a) is a part of a second integrated circuit, and wherein the determining of (a) and the controlling of (b) are performed by the first integrated circuit.

24. The method of claim 19, further comprising:
using error information in a packet to determine the error rate, wherein the packet is received onto a first integrated circuit via a second SerDes link, wherein the determining of (a) is performed by the first integrated circuit, and wherein the SerDes receiver is not a part of the first integrated circuit.

25. The method of claim 24, wherein the packet is a keep alive sync packet.

26. The method of claim 24, wherein the error information is related to the information passing across the first SerDes link in (a).

27. The method of claim 24, wherein circuitry in a second integrated circuit detects an error in the information passing across the SerDes link in (a) and generates therefrom the error information, and wherein the second integrated circuit incorporates the error information into the packet and transmits the packet to the first integrated circuit via the second SerDes link.

28. The method of claim 19, wherein the determining of (a) and the controlling of (b) are performed by a first integrated circuit that includes a SerDes transmitter, wherein the information passing across the first SerDes link is transmitted from the SerDes transmitter, and wherein the SerDes receiver is a part of a second integrated circuit, wherein the first integrated circuit includes a Central Processing Unit (CPU), wherein the second integrated circuit includes a memory, and wherein the CPU of the first integrated circuit accesses the memory of the second integrated circuit using the first SerDes link.

29. The method of claim 19, wherein the determining of (a) and the controlling of (b) are performed by a first integrated circuit within a battery-powered wireless mobile communication device.

30. A method comprising:
(a) receiving a first SerDes communication via a first SerDes link from a first device and onto a second device, wherein the first SerDes communication is received onto a SerDes receiver of the second device;
(b) determining on the second device that an error occurred in the first SerDes communication and in response to said determining sending a second SerDes communication across a second SerDes link from the second device to the first device, wherein the second SerDes communication includes a number of transmission errors present in the first SerDes communication;
(c) when an error rate based on the second communication is outside an acceptable range, transmitting a third SerDes communication from the first device to the second device via the first SerDes link; and
(d) using information in the third SerDes communication to adjust an input impedance setting of the SerDes receiver of the second device.

31. The method of claim 30, wherein the error rate comprises a total number of errors divided by a number of bits attempted to be transmitted.

32. The method of claim 30, wherein (a), (b), (c) and (d) are performed by a second integrated circuit and are repeated multiple times such that an error rate of the first SerDes link is substantially maintained between a lower error rate bound and an upper error rate bound.

33. An integrated circuit comprising:
a SerDes receiver; and
a controller coupled to the SerDes receiver, wherein the controller determines an error rate for a SerDes link involving the SerDes receiver, wherein the controller adjusts a power consumption setting supplied by the controller to the SerDes receiver such that that the error rate is substantially maintained between a lower error rate bound and an upper error rate bound, wherein when the error rate remains outside the lower error rate bound and the upper error rate bound, the controller is configured to provide an indication to a SerDes transmitter to transmit an indication across the SerDes link to a further SerDes device to alter power consumption in the further SerDes device.

34. The integrated circuit of claim 33, wherein the controller includes error detection circuitry that detects errors in communications made across the SerDes link, and wherein the controller uses error information generated by the error detection circuitry to determine the error rate for the SerDes link.

35. The integrated circuit of claim 33, wherein the SerDes receiver includes a loop filter, and wherein the power consumption setting comprises a setting of the loop filter.

36. The integrated circuit of claim 33, wherein the SerDes receiver includes a digital filter, and wherein the power consumption setting is a setting that prevents a digital clock signal from being supplied to a portion of the digital filter.

37. The integrated circuit of claim 33, wherein the SerDes receiver includes a clock and data recovery circuit, and wherein the power consumption setting comprises a setting of the clock and data recovery circuit.

38. The integrated circuit of claim 33, wherein the SerDes receiver includes an equalizer, and wherein the power consumption setting comprises a setting of the equalizer.

39. The integrated circuit of claim 33, wherein the SerDes receiver includes an equalizer, and wherein the power consumption setting comprises a setting that enables a high frequency boost of the equalizer.

40. The integrated circuit of claim 33, wherein the SerDes receiver includes a Phase-Locked Loop (PLL) that outputs a multi-phase clock signal, and wherein the power consumption setting comprises a setting of the PLL.

41. The integrated circuit of claim 33, wherein the SerDes receiver has an input impedance, and wherein the power consumption setting comprises a setting that determines the input impedance of the SerDes receiver.

42. An integrated circuit comprising:
a first SerDes receiver adapted to receive information via a second SerDes link;
a SerDes transmitter adapted to transmit information via a first SerDes link to a second SerDes receiver; and
a controller coupled to the first SerDes receiver and to the SerDes transmitter, wherein the controller receives error information via the first SerDes receiver and uses the error information to determine an error rate of the first SerDes link, wherein when the error rate of the first SerDes link remains outside an acceptable boundary, the controller causes the SerDes transmitter to transmit a control packet to the second SerDes receiver to adjust an input impedance of the second SerDes receiver such that the error rate of the first SerDes link is substantially maintained between a lower error rate bound and an upper error rate bound.

43. The integrated circuit of claim 42, wherein the error information is received onto the integrated circuit across the second SerDes link as part of a keep alive sync packet.

44. The integrated circuit of claim 42, further comprising:
a Central Processing Unit (CPU) that performs a memory access across the first and second SerDes links.

45. An integrated circuit comprising:
a SerDes receiver adapted to receive information via a first SerDes link, wherein the first SerDes link has an error rate;
a SerDes transmitter adapted to transmit information via a second SerDes link; and
a controller coupled to the first SerDes receiver and to the SerDes transmitter, wherein the controller determines a number of transmission errors present in a first SerDes communication across the first SerDes link, and wherein the controller causes the number of transmission errors to be communicated in a second SerDes communication across the second SerDes link, and when an error rate based on the second communication is outside an acceptable range, the SerDes receiver is configured to receive a control packet in a third SerDes communication via the first SerDes link and in response to the control packet, an input impedance of the second SerDes receiver is adjusted such that that the error rate of the first SerDes link is substantially maintained between a lower error rate bound and an upper error rate bound.

46. The integrated circuit of claim 45, wherein the second SerDes communication is a communication of a keep alive sync packet.

47. The integrated circuit of claim 45, further comprising:
a memory coupled to the controller, wherein memory can be accessed by another integrated circuit using the first and second SerDes links.

48. An apparatus, comprising:
means for determining an error rate of a (Serializer/Deserializer) SerDes link, wherein information passing across the SerDes link is received by a SerDes receiver; and
means for controlling a power consumption setting of the SerDes receiver such that the error rate is substantially maintained between a lower error rate bound and an upper error rate bound,
wherein when the error rate for transmissions received by the SerDes receiver remains outside the lower error rate bound and the upper error rate bound, the first SerDes receiver is configured to transmit an indication across the SerDes link to a further SerDes device to alter power consumption in the further SerDes device.

49. A non-transitory computer readable medium embodying code executable by a processor for implementing a method for providing, from a user device, wireless transmissions over a plurality of sub-carriers, the method comprising:
determining an error rate of a (Serializer/Deserializer) SerDes link, wherein information passing across the SerDes link is received by a SerDes receiver; and
controlling a power consumption setting of the SerDes receiver such that the error rate is substantially maintained between a lower error rate bound and an upper error rate bound,
wherein when the error rate for transmissions received by the SerDes receiver remains outside the lower error rate bound and the upper error rate bound, the first SerDes receiver is configured to transmit an indication across the SerDes link to a further SerDes device to alter power consumption in the further SerDes device.

* * * * *

UNITED STATES PATENT AND TRADEMARK OFFICE
CERTIFICATE OF CORRECTION

PATENT NO. : 8,578,222 B2
APPLICATION NO. : 13/029934
DATED : November 5, 2013
INVENTOR(S) : Dexter T. Chun et al.

Page 1 of 1

It is certified that error appears in the above-identified patent and that said Letters Patent is hereby corrected as shown below:

IN THE CLAIMS

Claim 1, Col. 18, line 40, change "SerDes device across the first SerDes link is" to --SerDes device across the second SerDes link is--

Claim 19, Col. 20, line 21, change "(b) controlling a power consumption setting of the SerDes" to --(b) controlling an input impedance setting of the SerDes--

Signed and Sealed this
Seventh Day of October, 2014

Michelle K. Lee
*Deputy Director of the United States Patent and Trademark Office*